United States Patent
Santora, Jr.

(10) Patent No.: US 12,030,419 B2
(45) Date of Patent: Jul. 9, 2024

(54) AUTOMATED PALLET CONTAINER HYBRID

(71) Applicant: LOGIC PALLET, LLC, New York, NY (US)

(72) Inventor: Michael Vincent Santora, Jr., New York, NY (US)

(73) Assignee: LOGIC PALLET, LLC, New York, NY (US)

( * ) Notice: Subject to any disclaimer, the term of this patent is extended or adjusted under 35 U.S.C. 154(b) by 190 days.

(21) Appl. No.: 17/783,107

(22) PCT Filed: Dec. 16, 2020

(86) PCT No.: PCT/US2020/065275
§ 371 (c)(1),
(2) Date: Jun. 7, 2022

(87) PCT Pub. No.: WO2021/126955
PCT Pub. Date: Jun. 24, 2021

(65) Prior Publication Data
US 2023/0025818 A1     Jan. 26, 2023

Related U.S. Application Data

(60) Provisional application No. 62/974,682, filed on Dec. 18, 2019.

(51) Int. Cl.
*B60P 1/64* (2006.01)
*B65D 19/06* (2006.01)
*B65D 19/42* (2006.01)

(52) U.S. Cl.
CPC ............ *B60P 1/6481* (2013.01); *B65D 19/06* (2013.01); *B65D 19/42* (2013.01); *B65D 2519/00716* (2013.01); *B65D 2519/00781* (2013.01)

(58) Field of Classification Search
CPC ....... B60P 1/6481; B65D 19/06; B65D 19/42; B65D 2519/00701; B65D 2519/00716; B65D 2519/00781
(Continued)

(56) References Cited

U.S. PATENT DOCUMENTS 2,647,287 A * 8/1953 Jones .................. E04B 1/34321
                                                    D25/33
3,584,757 A    6/1971 Blaisdell
(Continued)

FOREIGN PATENT DOCUMENTS

EP          1350728 A2    10/2003
WO     2008/129137 A1    10/2008

OTHER PUBLICATIONS

International Search Report and Written Opinion in corresponding International Patent Application No. PCT/US2020/065275 dated May 25, 2021.

*Primary Examiner* — Jose V Chen
(74) *Attorney, Agent, or Firm* — Lando & Anastasi, LLP

(57) ABSTRACT

An intermodal container includes a base (100) having a defined number of sides. The base is configured to support products during transport. The intermodal container further includes a removable cover (104) having a top and a defined number of sides matching the defined number of sides of the base. The removable cover is configured to be releasably secured to the base to define an enclosure in a use position and to be removed and flattened in a stored position.

16 Claims, 29 Drawing Sheets

(58) Field of Classification Search
USPC .................................. 108/55.1, 54.1, 55.5
See application file for complete search history.

(56) References Cited

U.S. PATENT DOCUMENTS

| | | | | |
|---|---|---|---|---|
| 4,112,854 A * | 9/1978 | Pitchford | ........... | B65D 19/0095 |
| | | | | 108/57.32 |
| 4,765,252 A * | 8/1988 | Shuert | ................ | B65D 15/22 |
| | | | | 220/4.28 |
| 4,936,451 A * | 6/1990 | Shuert | ................ | B65D 19/06 |
| | | | | 206/386 |
| 4,989,731 A * | 2/1991 | Shuert | ................ | B65D 15/22 |
| | | | | 206/386 |
| 5,109,985 A * | 5/1992 | Rose | ................ | B65D 19/06 |
| | | | | 206/600 |
| 5,538,178 A * | 7/1996 | Zink | ................ | B65D 19/06 |
| | | | | 493/115 |
| 5,722,328 A * | 3/1998 | Darby | ................ | B65D 19/06 |
| | | | | 206/600 |
| 7,673,569 B2 * | 3/2010 | Ishikawa | ................ | B65D 19/44 |
| | | | | 108/55.1 |
| 8,925,470 B2 * | 1/2015 | Hart | ................ | B65D 71/0092 |
| | | | | 108/55.1 |
| 9,075,412 B2 | 7/2015 | Dixon et al. | | |
| 10,214,354 B2 * | 2/2019 | Toebes | ............ | G05B 19/41895 |
| 2002/0096516 A1 * | 7/2002 | Garfinkle | ........... | B65D 71/0096 |
| | | | | 220/1.5 |
| 2002/0113068 A1 * | 8/2002 | Tabor | ................ | B65D 19/0028 |
| | | | | 220/4.28 |
| 2003/0071038 A1 * | 4/2003 | Tanzer | ................ | B65D 19/20 |
| | | | | 220/4.29 |
| 2014/0277955 A1 | 9/2014 | Eidelson | | |
| 2016/0332554 A1 | 11/2016 | Ambrosio et al. | | |
| 2018/0127148 A1 * | 5/2018 | Kuhn | ................ | B65D 19/20 |
| 2019/0031394 A1 * | 1/2019 | Millhouse | ............ | B65D 19/42 |
| 2019/0270545 A1 * | 9/2019 | Apps | ................ | B65D 21/086 |
| 2019/0283239 A1 | 9/2019 | Skaaksrud et al. | | |
| 2019/0300235 A1 * | 10/2019 | Jefferson | ............ | B60B 33/0086 |
| 2019/0352101 A1 * | 11/2019 | Levine | ................ | B65D 19/42 |
| 2020/0346908 A1 * | 11/2020 | Macalus | ................ | B65D 19/06 |

* cited by examiner

AUTOMATED PALLET CONTAINER HYBRID

CROSS-REFERENCE TO RELATED APPLICATION

This application is a U.S. National Phase Application and claims the benefit of priority under 35 U.S.C.§ 371 of International (PCT) Patent Application Serial No. PCT/US2020/065275, filed on Dec. 16, 2020, which claims priority under 35 U.S.C. § 119(e) to U.S. Provisional Patent Application No. 62/974,682, filed Dec. 18, 2019, titled AUTOMATED PALLET CONTAINER HYBRID (APCH), which is incorporated by reference in its entirety for all purposes.

BACKGROUND OF THE DISCLOSURE

The present disclosure relates to shipping pallets and intermodal containers of various shapes, sizes and content and the manner in which they are transferred between and move in and around buildings, facilities and vehicles. Automated pallet containers of embodiments of the present disclosure combine an improved shipping pallet and intermodal container to create a replacement for the current wooden and plastic shipping pallets and metal intermodal containers that dominate the industry.

Historically the "last mile" distribution of goods has been the responsibility of the purchaser or end user. For example, goods arrive from a country of origin or place of manufacture to regional ports. From there, goods are moved to distribution centers and then primarily to retail stores where end users purchase them and take them to their place of business or residence. The growth of e-commerce has changed in the sense that goods now go directly from the distribution centers to the end user's place of business or residence, which is causing an increase in local shipping and thus an increase in traffic and air pollution generated by the limited, inefficient modes of freight transportation available.

As population and urbanization increases at a far faster rate than the necessary infrastructure improvements to support this growth, the immediate result is an increase in the congestion and pollution already plaguing our cities. The e-commerce phenomenon compounds this issue as most last mile deliveries are done by motor vehicle.

Pallets and containers are traditionally not provided as a combined unit. Currently items are loaded onto shipping pallets, shipping pallets are loaded into intermodal containers and intermodal containers are loaded onto vehicles. These processes are cumbersome and timely.

The size of containerized items is changing. Containerized goods are miniaturizing, which is creating the need for smaller, more versatile containers. For example, a twenty-foot container can be configured to fit approximately 100 CRT televisions, but the same container today could carry 600 flat-screen televisions. Statistics also show more and more products are transported in smaller quantities year after year. Congestion caused by ultra-large ships, for instance fully counteracts the expected unit cost benefits of bulk shipping, so increasing the size of vehicles to meet the rising demand of e-commerce is not the solution. Similarly, increasing the number of vehicles which in turn just propagates congestion and pollution is not the solution.

There is a major gap in through transport; a rising trend. Through transport is the idea of an item being placed in a single container from the facility where it was manufactured to the final destination. Although the same intermodal container can be used on certain ships, trains, or trucks, in many cases through transport is not being used to its fullest potential. Typically, items that originate overseas are unpacked and repacked at their port of entry and several other times along its journey, particularly the 90 percent of containers arriving at port that are destined for inland destinations. The lack of flexible movement within facilities and smaller, more frequent vehicles limit point-to-point networks and prevent faster turnaround times in ports. Up to the present day, customers have favored lower cost over better service when it came to shipping. As this trend continues, scale gets deprioritized in favor of flexibility and modularity. The limitations on terminal pricing structures don't accurately reflect the costs borne by terminal operators and therefore incentivizes inefficient behaviors solely for economic stability.

Shippers are not aligned with other shippers. An item is handled by multiple shippers during its journey from place of origin to destination. Each shipper is concerned with their own link in the chain and strive make their link in the chain more efficient at the cost of making the other links in the chain less efficient. Historically, the battle between shippers was won by economies of scale. Larger terminals can sustain higher levels of utilization. Double-stack trains reduce on-carriage costs. Larger freight forwarders have more relationships and bargaining power with transport providers, enabling them to offer better services to beneficial cargo owners. However, the costs of scale have negative impacts. For instance, even larger ships are forcing more frequent and more expensive investments in new port infrastructure, depressing container terminals returns which in turn decreases efficiency.

Consumers are demanding greater speed and flexibility of delivery service. As e-commerce consumers push harder for speed and flexibility of service, even at a higher price, it becomes more apparent that the limiting factor is the lack of modular solutions for shipping pallets and containers that would allow for faster shipping times through faster transfer of containers between buildings, facilities and vehicles.

Cities are not set up for last mile end user delivery. In most cities, permitted land uses generally fall into three categories; commercial, industrial and residential. Cities were formed in manner where commercial zones were used to buffer residential from industrial, and items created in the industrial sectors moved in a linear fashion to commercial sectors and temporary or permanent occupants of the commercial sectors would then transfer items to the residential sector. The evolution in the way goods are purchased is influencing the way goods are transported and it is overwhelming the current transportation infrastructure.

Moreover, there are no universal containers for last mile delivery. When items are packed for distribution from the manufacturer, the packing configuration is designed to fit the conveyance. As they get further down the distribution chain, they are subject to a mix of vehicles that cause items to be repacked several times which limits the efficiency of the process.

Passenger and freight transportation systems are not integrated. Transportation infrastructure has limitations such as the length or weight of freight vehicles it can carry, and where freight vehicles can reach. However, access for passenger vehicles is provided to every location. In order to comply with the limitations but still deliver goods, vehicles that typically don't carry freight need to do so to meet rising demand. Currently, there is no formal integration between passenger and freight transportation and freight operations do not allow passenger transportation to also carry freight, primarily because the time and manner in which freight is transferred between a building or facility and a vehicle.

Freight cannot make effective use of off-peak times. The majority of transferred items are moved during normal business hours, which is inherently the busiest time, largely due to the fact that the labor forces elect not to work or work only for higher wages outside of normal business hours. This limits the ultimate capacity of transportation infrastructure and the industry cannot take advantage of lower congestion during off peak hours. The loading and unloading of items and the movement of containers between and within buildings, facilities and vehicles is still largely a manual process which limits the advantages available in off peak times.

The way items move in, out and around buildings and facilities is inefficient. Loading docks are the standard point where goods move between vehicles and buildings and facilities. Loading docks are troublesome in urban areas for many reasons; they interrupt the architectural form of a building and create pockets of blight in their immediate surroundings. Loading docks need to cross sidewalks and bike lanes and on narrow streets cause blockages to the traffic flow when large vehicles enter and exit the loading dock. The alternative to not having loading docks is street loading. Street loading which typically occurs on the sidewalk adjacent to the building goods are being distributed to or from disrupts the pedestrian flow and causes unsanitary conditions when perishable goods or waste is waiting to be transferred. The amount of time that loading and unloading takes is the primary reason loading docks have to exist in the configuration that they do (to harbor the vehicle for this extended period of time) and why street loading is so disruptive.

Further, facilities need excess space for conveyances. One of the biggest challenges in the face of population growth and urbanism is finding adequate land for facilities. This is largely because efficient warehouses require low density, high coverage, single floor buildings to facilitate the amount of horizontal movement and clearances for conveyances that enable those movements; a property type that is hard to come by, especially where the rise in demand is occurring. As long as shipping pallets need to be moved by a conveyance, those facilities require space for storage and movement limiting the spatial efficiency and location of facilities. Empty containers are especially problematic since whether empty or full the container takes up space. Thus, transporting or storing empty containers is inefficient. As long as manufacturing is more efficient on a large scale basis, goods still have to move from place to place and due to standards of living, such as noise control and exposure to pollution, there will continue to be a sizable distance between a products origin and destination unless conveyances can be eliminated to expand location optionality for modern facilities.

With present delivery methods, vehicles have to stop to load and unload containers. Efficiency in the movement of items especially in high density areas or over great distances is achieved by loading as many items as possible on the same vehicles to reduce environmental impacts and operational costs. Routes are created so vehicles can drop off and pick up at intermediate locations between the origin and final destination; however, the constant repetitive stops to load and unload wastes time and energy and elongates the delivery process.

Manual facilities are injury prone. Numerous studies have shown that workers in facilities have an OSHA incident rate, which compares the number of serious injuries to the number of total hours worked among all employees at a given worksite, that is five times greater than the national average for all workers.

SUMMARY OF THE DISCLOSURE

In accordance with the present disclosure, an automated pallet container comprises a base of uniform shape, which can interlink with other bases to increase in size, an enclosure, which can cover the loaded base allowing it to dually function as an intermodal container defined herein as an automated pallet container, and an on-board or on-grid integrated motion and guidance system as a means for self-propulsion. The automated pallet container is designed to move independently through a building or facility and automatically and rapidly connect and disconnect from vehicles at rest or in motion.

A proprietary computerized logistics system is configured to control the tracking and movement of all automated pallet containers. Automated pallet containers are tagged and scanned by photo eyes and lasers to determine their continuous location. The software is responsible for the movement of the automated pallet container. In one embodiment, the automated pallet container is configured to depart from and arrive to a facility or building. In another embodiment, the automated pallet container is configured to be loaded and unloaded from lifts and vehicles, and synchronized with a belt conveyor system. This system is configured to unify global product tracking.

The design of facilities is evolving to incorporate the infrastructure required to support the automated pallet containers automated processes. The technology surrounding the automated pallet container is compatible with current facility automation technology. With the new efficiencies, several new smaller facilities driven by the growing demand of e-commerce will be constructed adjacent to and integrated into passenger transportation stations so that a single vehicle can carry both automated pallet containers and passengers simultaneously without adversely impacting their routes or schedules.

Similarly, vehicles are modified to allow for fast seamless connections with the automated pallet container and the integration of passenger and freight transportation networks as well as interactions with synchronized belt conveyor systems to allow the transfer of goods between buildings, facilities and vehicles, even while the vehicle remains in motion.

In one embodiment, the automated pallet container is a self-moving, self-loading, automated modular pallet that is flexible in size and convertible to a container that gets items closer to their destination using existing underutilized infrastructure thus reducing the time, cost and environmental impacts of the current shipping process.

One aspect of the present disclosure is directed to an intermodal container comprising a base having a defined number of sides. The base is configured to support products during transport. The intermodal container further comprises a removable cover having a top and a defined number of sides matching the defined number of sides of the base. The removable cover is configured to be releasably secured to the base to define an enclosure in a use position and to be removed and flattened in a stored position.

Embodiments of the intermodal container further may include configuring the defined number of sides of the base to have four and the defined number of sides of the removable cover is four. The base further may include at least one void formed therein to enable a conveyance to lift and move the base. The base further may include wheels or casters provided on a bottom of the base to enable movement of the base on a horizontal surface. The base further may include a motor integrated into the base to drive the rotation of wheels or casters to move the base along a surface. The base further may include a power storage device integrated into the base to provide means for powering the motor. The base further may include an interlocking mechanism integrated into the base to provide connect the base to a vehicle. The base further may include at least one interlocking device integrated into the base to connect a base to another base. The base further may include an electromagnetic device integrated into the base to guide motion of the base. The base further may include one or more electromagnetic device integrated into the base to levitate above a surface. The base further may include one or more electromagnetic devices integrated into the base to interact with corresponding magnets in an adjacent surface to power motion of the base. The base further may include one or more electromagnetic devices integrated into the base to connect the base to a vehicle. The automated pallet container further may include multiple bases interconnected to one another, with the cover being configured to be secured to the multiple bases. The base further may include a system configured to enable the base to move independently. The base may be formed with a perimeter lip and attachment devices to releasably secure the cover to the base. The automated pallet container further may include a system to enable tracking of products supported by the base and enclosed by the cover. The system may use the location services of a data network to determine a location of the automated pallet container. The automated pallet container further includes a controller integrated into the base to control the operation of the system and base. The controller may be configured to control an interlocking system designed to engage or disengage the base from a support surface. The controller may be configured to determine whether the base is properly aligned with a lift or a vehicle to permit controlled movement of the automated pallet container between the lift and the vehicle.

Another aspect of the present disclosure is directed to system of moving products. In one embodiment, the system comprises an intermodal container including a base having a defined number of sides, the base being configured to support products during transport, and a removable cover having a top and a defined number of sides matching the defined number of sides of the base. The removable cover is configured to be releasably secured to the base to define an enclosure. The system further comprises a controller configured to identify and monitor a location of the intermodal container.

Embodiments of the system further may include configuring the controller to operate with a vehicle configured to support and transport the intermodal container. The controller further may be configured to operate with a belt conveyor system provided on a platform of a facility. The belt conveyor system may include a conveyer belt that moves at a synchronized speed with the vehicle to enable the loading and unloading of the intermodal container. The vehicle may include at least one hinged flap to bridge a gap between the vehicle and a belt conveyor system when the automated pallet container moves itself laterally between the vehicle and the belt conveyor system. At least one flap may be configured to be moved to and from a generally vertical position in which the flap is positioned against the automated pallet container and a generally horizontal position in which the flap extends horizontally away from the vehicle. The flap may also act as a lift gate where it can move vertically to carry the automated pallet container from the bed of a vehicle to ground level and vice versa. The controller may be configured to monitor a position of the at least one hinged flap.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE DISCLOSURE

Figure 1:
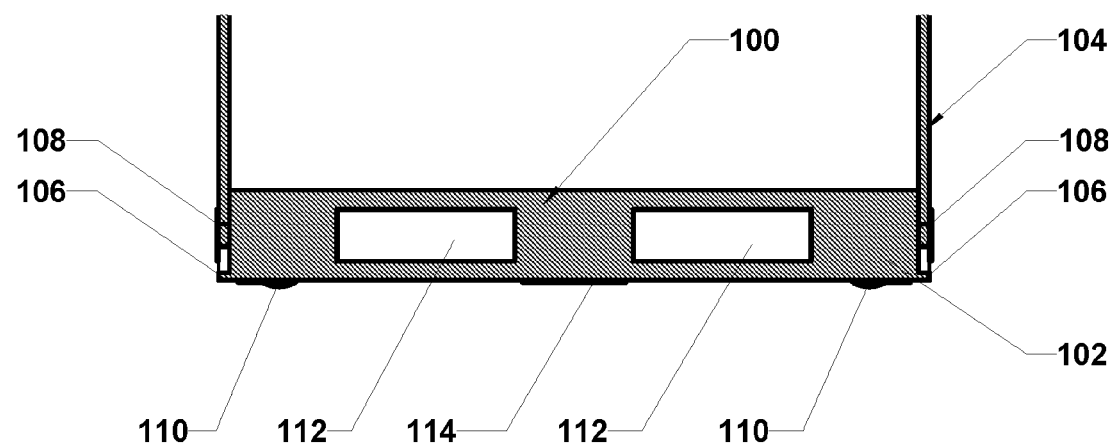
FIG. 1 is a front cross-sectional view of a base of an automated pallet container of an embodiment of the present disclosure.

Embodiments of an automated pallet container described herein allow existing passenger transit vehicles such as trains, ferries and busses as well as private non-freight vehicles to dually participate in supply chain as well as improve the way goods enter and exit facilities and how they move horizontally and vertically within a facility and how these movements save space in such facilities which adds flexibility to location. It also allows for the transfer of goods between a moving vehicle and a stationary facility saving time and energy, thus addressing the following disadvantages that heretofore have plagued last mile distribution. In one embodiment, the facility is a distribution facility.

The primary components of the automated pallet container consist of a base that resembles a conventional shipping pallet in scale in which items can be loaded onto, and a five-sided cover which fits on top of the base to fully and securely enclose the items loaded onto the base and form the full automated pallet container unit. Materials may vary but the automated pallet container is primarily constructed of metal, carbon fiber and/or plastic. The automated pallet container is self-contained, and does not need to be loaded into an intermodal container since the assembled automated pallet container functions as an intermodal container and is designed to interlink with other automated pallet containers to form flexible sized intermodal containers. The automated pallet container is also designed to bifurcate to function solely as a shipping pallet also of varying size and capacity.

The secondary components in the base constitute the improvement over a shipping pallet. They consist of electromagnets for guidance, levitation, interlocking and motion. Alternatively, conventional wheels or casters coupled with onboard power sources, such as batteries and motors, may also provide the motion. Conventional positioning systems further provide the guidance of the automated pallet container, while conventional coupling mechanisms provide the interlocking of automated pallet containers with one another. The automated pallet container is configured to move itself, whereas traditional shipping pallets and intermodal containers are moved around a facility by the current methods, such as forklifts, pallet jacks and automated and robotic pallet movers. The automated pallet container moves horizontally, independently and with the help of lifts or elevators, moves vertically throughout a facility.

The automated pallet container of embodiments of the present disclosure is designed to function with standard manual and automated (through use of a palletizer or similar) pallet loading procedures. Automated pallet containers are configured to join together with other automated pallet containers vertically or horizontally to accommodate varying load size through manual interlockings or electromagnetic connections. The automated pallet container is configured to be fitted with multi directional wheels, casters or rollers on the underside to allow them to move across a warehouse or distribution center without the use of an external device, such as a fork lift, although the automated pallet container can contain voids so that they can be moved by fork lift when necessary as the automated pallet container begins to integrate into the market. In one embodiment, the motion of the automated pallet container can be controlled by an onboard electric propulsion and magnetic guidance system and rechargeable battery. Other guidance systems could be used as well. Alternatively, the wheels, casters or rollers can be substituted or supplemented with electromagnetic levitation technology capable of dynamic stability coupled with a magnetic propulsion and guidance system (such as a linear induction motor) built into the floor of the facilities in which the automated pallet containers operate. Either configuration allows an automated pallet container to move from the loading area of the facility to the distribution area where the automated pallet container can self-load onto the vehicle that transports the automated pallet container to its final destination.

Laser guidance and computer controlled logistical organization can be provided to facilitate the movement between the facility and intermodal transportation systems carrying the automated pallet container, minimizing the time it takes for an automated pallet container to pass between the two thus permitting the loading and unloading of freight on or off a transporting vehicle to occur at a rate equal to or faster than the rate passengers can embark and disembark from the same mode of transportation. Other systems can be provided as well, such as weight sensors, inertial measurement units and cameras, to assist in the movement of the automated pallet container within a facility and transportation systems.

In one embodiment, the automated pallet container can be configured to operate within a facility to accommodate the intermodal vehicles that are used in the transfer of goods between receiving and distribution facilities, how those vehicles may be loaded and unloaded while still in motion through the use of aligned synchronized conveyors and the design of such software to facilitate the movements and track the locations of the automated pallet containers. The automated pallet container can also be configured to vertically move through different floors of a distribution or receiving facility so that such a facility can be orientated to have multiple floors stacked vertically as opposed to a single horizontal space.

Accordingly, in addition to the object and advantages of automated pallet container described above, several objects and advantages of the present disclosure are as follows.

In some embodiments, the automated pallet container is both pallet and container. Having a pallet instantaneously convert to a container and back to a pallet saves the time, effort and manpower it takes to load pallets into and out of containers. It also reduces spatial requirements in and around facilities.

In some embodiments, the cover embodies a five-sided cover preferably made of similar materials of the base, the cover being designed to sit atop the base to enclose the items the base is carrying. The cover has four equal sides that abut each other perpendicularly when they are in the vertical position all attached to one of four sides of a top the same size as the base. When the base and cover are joined, they form a rectangular cuboid referred to as an automated pallet container. The long sides of the cover all meet the top a ninety-degree angle when set atop the base and they are connected by hinges. When the cover is removed and set at rest, the hinges rotate ninety degrees so that the top and all four sides are on the same horizontal plane and the cover lays flat forming an equal armed cross shape.

In some embodiments, the automated pallet container is sized for a miniaturizing world. Global technological advances have reduced the size of items almost universally; however, the size of a standard shipping pallet and intermodal container haven't changed in over 75 years. The automated pallet container is modular, so it can match the current size of standard pallets and containers as well as assemble into a variety of larger or smaller configurations. The flexibility allows for the implementation of more efficient shipping methods and the reduction or elimination of intermediate unpacking and repacking of Items along the supply chain.

In some embodiments, the automated pallet container makes through transport possible. Through transport is a method of shipping that eliminates intermediate facilities to reduce cost and transportation times. The concept is that a product leaves its manufacturing facility and through a single trip arrives to its end user. The modular functionality of the automated pallet container and ability to form larger and smaller pallets or containers instantaneously means that loads sized for their destination can be achieved without unpacking and repacking thus eliminating the need for intermediate facilities promoting behaviors that result in higher efficiency for all parties, including customer.

In some embodiments, the automated pallet container allows competing shippers to work together. The automated pallet container can be configured to be universal across its multitude of sizing options. This broad standardization allows for shipping companies with various vehicles to partner on routes to improve the efficiency of the transportation of items. True universal tracking can be achieved because pallets and containers of any size are the essentially all the same thing and can function the same way under one state-of-the-art control software. A universal pallet-container hybrid is the key element in allowing the implementation of consolidated urban centers in dense urban environments. In these proposed urban terminals, freight flows from interurban carriers are sorted and transferred to a neutral last-mile carrier to perform final deliveries. This operation would reduce both last-mile fleet size and average distance cost but can only be made possible if pallets, containers and tracking software are universal across all major shippers.

In some embodiments, the automated pallet container allows for greater speed and flexibility in shipping. By having a pallet that is also a container which can automatically increase and decrease in size, as needed, throughout the shipping process, eliminates intermediate unpacking and repacking. The current operation is the primary cause of delays in transit from the origin to the end user. The automated pallet container can be configured to allow an item to move nonstop from beginning origin to final destination.

In some embodiments, the automated pallet container helps cities deal with growing last mile demands. Infrastructure improvements are timely, costly and are usually subject to political challenges making a paradigm shift in freight transport highly improbable based on how infrastructure projects have historically proceeded. The automated pallet container can be configured to create the improvements needed to meet todays and tomorrows freight demands with only minor changes to existing infrastructure.

In some embodiments, the automated pallet container is a universal design. The automated pallet container is designed to be universal and integrate seamlessly to all existing buildings, facilities, vehicles and supporting transportation infrastructure. By creating a universal standard for pallets and containers the design of new facilities and delivery vehicles become more efficient and permit integration of a universal digital network.

In some embodiments, the automated pallet container is configured to leave a facility. A base of the automated pallet container is a self-moving pallet. Conventional pallets are designed to go everywhere, manufacturing facilities, distribution facilities, on vehicles, etc. The automated pallet container is configured to operate in any type of environment, not just in a dedicated facility. This sets the automated pallet container aside from other warehouse automation devices as nothing else on the market is designed to leave the single facility it operates in.

In some embodiments, the automated pallet container allows passenger infrastructure to now carry freight. Now more than ever the freight needs to follow the people. Historically freight networks such as rail or truck routes connected cities at limited points but did not access all of the places of residence and business within the city. Additionally, smaller streets and passenger rail/rapid transit lines are not fit to carry bulk freight in the most efficient manner. Automated pallet container connects with all freight networks and several passenger vehicles creating new opportunities in the realm of last mile delivery. Factory-to-consumer is a relatively unknown expression presently and can only become the standard of shipping through the implementation of the automated pallet container on a broad scale.

In some embodiments, the automated pallet container can work continuously. The automated loading and unloading and the internal motion of the automated pallet container permits freight to move at any time of the day without limitations due to working hours thus allowing for vehicles to move at the optimal times around passenger traffic easing congestion and making well balanced use of and new efficiencies for existing infrastructure.

In some embodiments, the automated pallet container improves the way items move within buildings and facilities. The self-propelled motion and non-stop loading and unloading to and from vehicles of the automated pallet container eliminates the need for conventional loading docks creating more location flexibility for urban facilities. The configuration of the automated pallet container also enhances vertical circulation giving the option for future facilities to grow efficiently, vertically whereas current operations only permit horizonal growth. This is paramount in dense areas where space is scarce and expensive.

In some embodiments, the automated pallet container is configured to permit side loading for vehicles, such as tractor trailers or trucks, as opposed to standard loading. For example, a 48-foot trailer that rear loads at a loading dock needs 130 feet of driveway perpendicular to the facility to make turns. The automated pallet container of embodiments of the present disclosure permit side loading of such vehicles, thereby saving space.

In some embodiments, the automated pallet container creates new spatial efficiencies within buildings and facilities. The automated pallet container is self-propelled or propelled by a grid within the floor and walls of the facility it operates in, which means additional space for the storage and circulation of automated pallet moving robots and fork lifts and other conveyances are both no longer required. By integrating vertical movement, storage and distribution facilities can then also become vertical which is a more appropriate building typology for urban environments.

In some embodiments, the automated pallet container allows vehicles to load and unload without stopping. The loading and unloading system of the automated pallet container allows them to transfer between vehicles, load onto a vehicle from a building or facility or unload from a vehicle to a building or facility while the vehicle stays in motion, providing a substantial decrease in delivery time, manpower and energy consumption.

In some embodiments, other items can be conveyed, including shipping pallets, intermodal containers and pedestrians so that they may board and alight a vehicle while the vehicle remains in motion.

In some embodiments, the automated pallet container is controlled by an operating system configured to provide temporary control of a velocity of a vehicle while they are aligned with a belt conveyor system to ensure synchronization during the transfer of automated pallet containers.

In some embodiments, the automated pallet container eliminates unsafe jobs. By automating dangerous, injure prone tasks, the automated pallet container takes the human risk element out of these jobs, while simultaneously creating new jobs in a safer environment.

Figure 2:
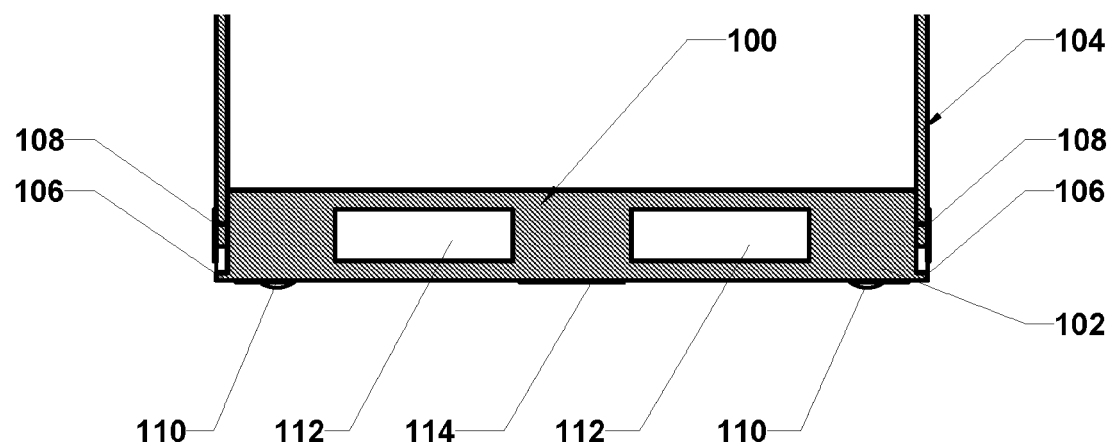
FIG. 2 is a side cross-sectional view of the base.

Referring to the drawings, and more particularly to FIGS. 1-6, a solid base of an automated pallet container, sometimes referred to herein as an intermodal container, is generally indicated at 100. As shown, the base 100 includes a rectangular body 102 that is configured to receive and support a cover, generally indicated at 104. A portion of the cover 104 is shown in FIGS. 1 and 2 for illustration purposes only. Although illustrated throughout the drawings as being rectangular, the base 100 can be shaped for a particular purpose. For example, the base 100 can be square-shaped, triangular-shaped, or polygonal-shaped. Further, the base 100 may be fabricated from a variety of materials, such as metal, carbon fiber and/or plastic. As shown, the body 100 includes a lip 106 that extends outwardly from the body 102 when the base rests on a horizontal surface. In one embodiment, the lip 106 extends beyond the body 102 a distance that corresponds to the thickness of the cover 104. The arrangement is such that the cover 104, when installed on the base 100, is received along edges of the body 102 of the base until an edge of the cover engages the lip 106 to support the cover in the shown vertical position.

Figure 3:
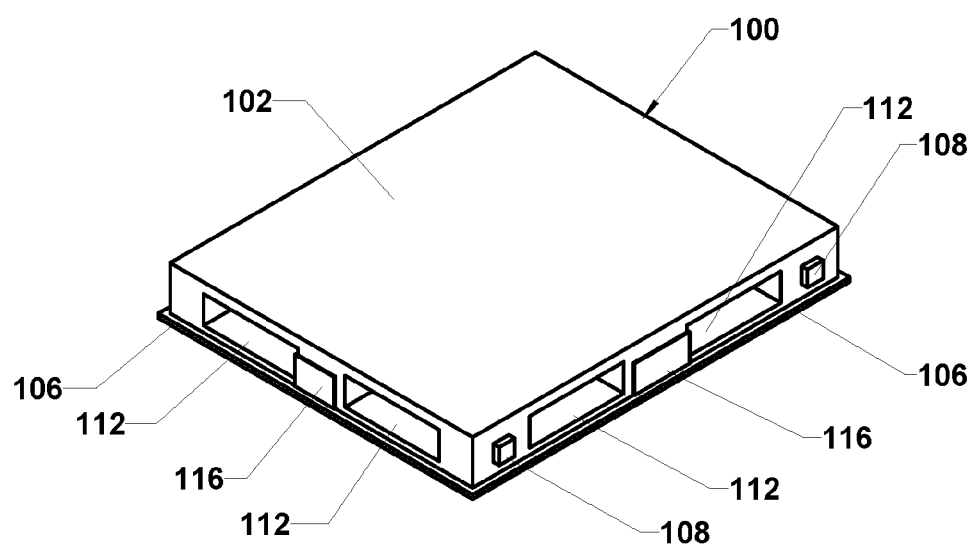
FIG. 3 is a top perspective view of the base.
Figure 4:
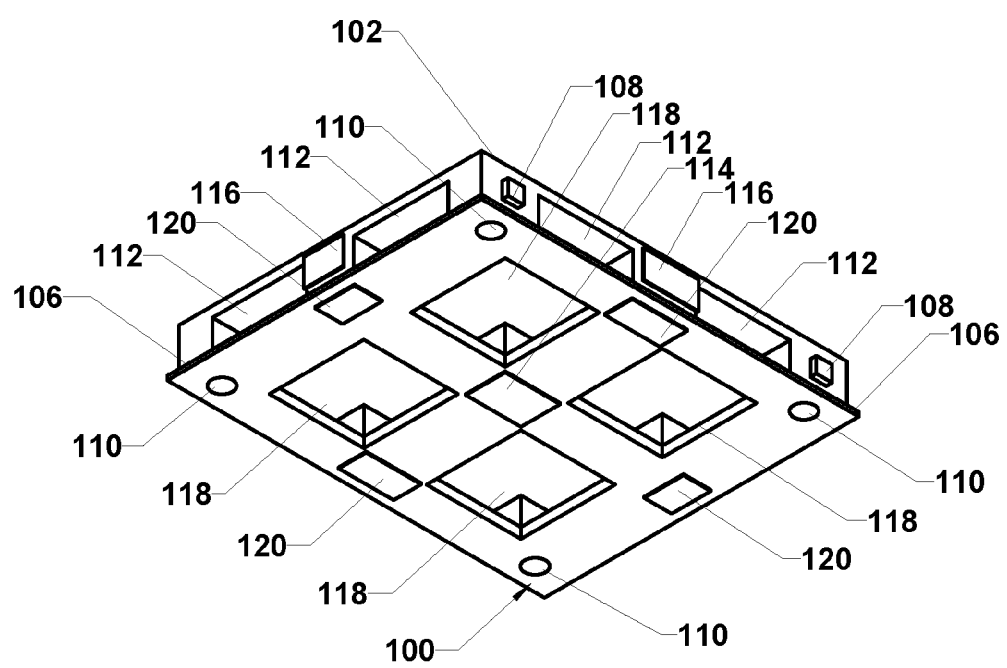
FIG. 4 is a bottom perspective view of the base.
Figure 5:
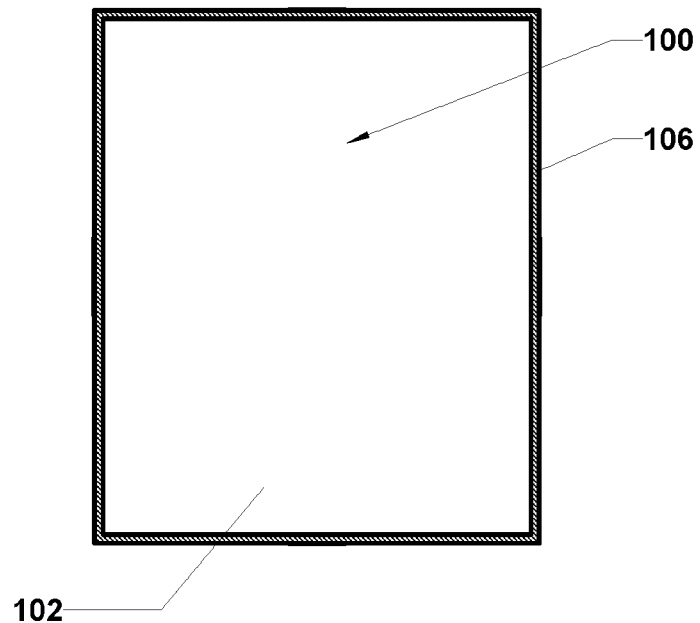
FIG. 5 is a top plan view of the base.

Referring particularly to FIGS. 3 and 4, in one embodiment, the base 100 further includes interlocking features, each indicated at 108, located on opposite long sides of the body 102 of the base. The interlocking features 108 are provided to releasably secure the cover 104 to the base 100. In one embodiment, the interlocking features 108 include rectangular elements that stand proud on the sides of the body 102 of the base, with the rectangular elements being received in openings formed in the cover 104, which is described in greater detail below during the description of the cover. The shape and size, of each element and each corresponding opening can be selected to achieve a particular purpose. For example, the elements can be square-shaped and configured to be received within square-shaped openings formed in the cover. In other embodiments, the interlocking features 108 can include magnets having polarities that are attracted to one another when placed proximate to one another.

Figure 6:
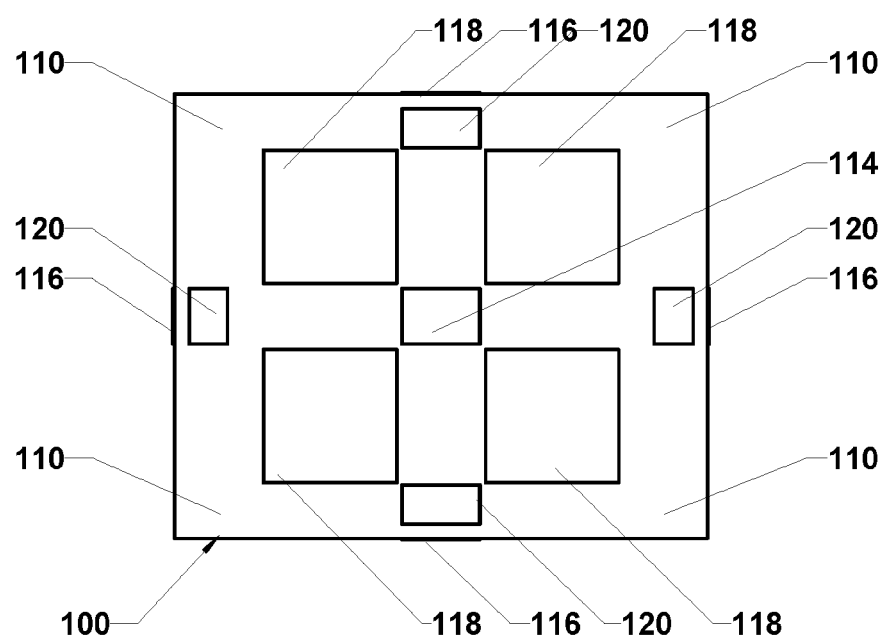
FIG. 6 is a bottom plan view of the base.
Figure 7:
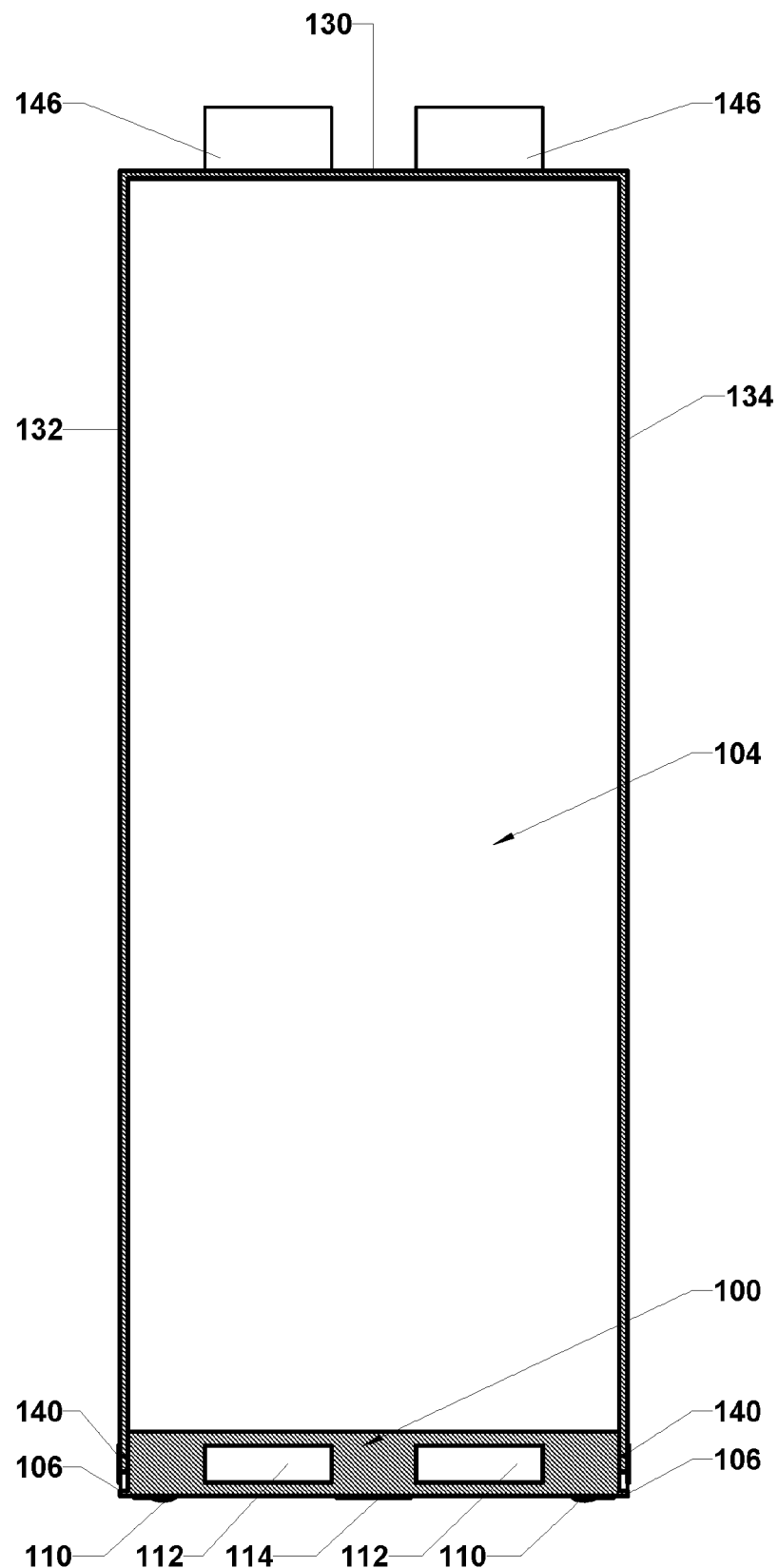
FIG. 7 is a front cross-sectional view of a fully assembled automated pallet container.
Figure 8:
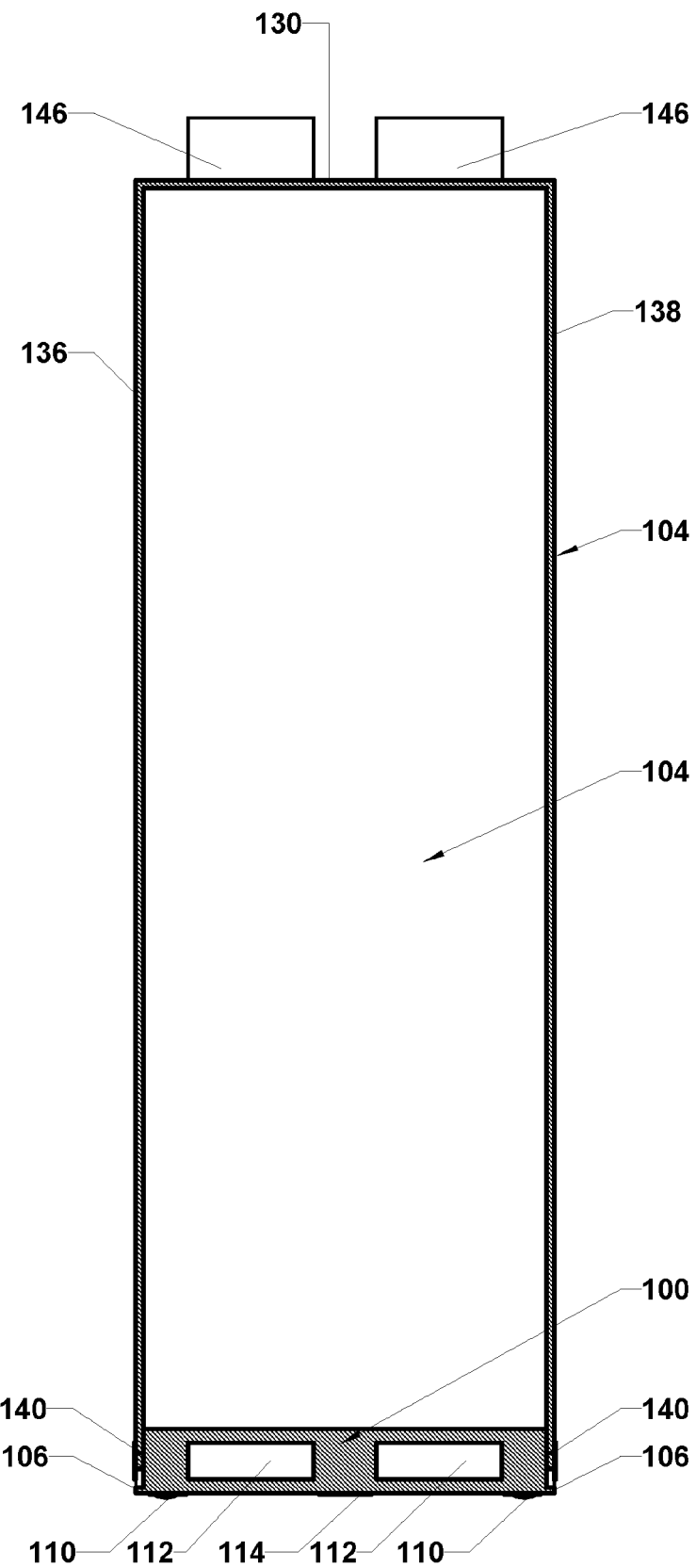
FIG. 8 is a side cross-sectional view of the automated pallet container.

Referring particularly to FIGS. 2, 4 and 6, in one embodiment, the base 100 further includes wheels or casters, each indicated at 110, which are provided on a bottom of the body 102 of the base to enable the base to roll across a horizontal surface, such as a floor of a facility. As best shown in FIGS. 4 and 6, the wheels or casters 110 are positioned at the four corners on the bottom of the body 102 of the base 100 to provide sufficient support for the base when positioned on the horizontal surface. In another embodiment, the base 100 can be configured to include an electromagnetic device provided on the bottom of the body 102 of the base to enable the base to levitate when exposed to a magnetic field provided by the horizontal surface. With this embodiment, the surface on which the base 100 travels is configured to provide a magnetic field that is designed for the base.

Referring to particularly to FIGS. 1-3, in one embodiment, the base 100 further includes openings, each indicated at 112, formed on both the short sides and the long sides of the body 102 of the base to enable the base to be engaged and moved by a conveyance device, such as a forklift. As shown, each opening 112 includes an elongate rectangular-shaped void that is sized to receive forks of the forklift therein, for example. The openings 112 provided on the short sides and the long sides of the body of the base are spaced from one another in the traditional manner to receive the forks of the forklift. Once engaged, the forklift can lift the base 100 off of the horizontal surface and placed at a desired location. As described herein, the openings 112 can be configured to receive elements of any type of conveyance device, such as pallet jacks, front loader jacking devices or cranes.

Referring particularly to FIGS. 4 and 6, in one embodiment, the base 100 further includes an electromagnetic device 114 provided on the bottom of the body 102 of the base to guide the base along a magnetic field, such as a magnetic field provided on the horizontal surface. In one example, the electromagnetic device 114 is provided to position the base 100 in a desired position on the horizontal surface. The electromagnetic device 114 can be controlled to provide the ability to lock or otherwise secure the base 100 to the horizontal surface and to unlock the base from the horizontal surface.

Referring particularly to FIGS. 3 and 4, in one embodiment, the base 100 further includes a mechanical or electromechanical device, each indicated at 116, provided on the short sides and the long sides of the body 102 of the base to secure the base to an adjacent base. The devices 116 are configured to releasably secure adjacent bases 100 during storage or transport, for example. The locations and the positions of the devices 116 on the sides of the base 100 can be manipulated and changed to achieve a desired effect. Other types of devices can be provided to secure the bases to one another, such as magnetic devices.

Referring particularly to FIGS. 4 and 6, in one embodiment, the base 100 further includes voids, each indicated at 118, formed on the bottom of the body 102 of the base to enable the stacking of fully assembled automated pallet containers with one another during storage or transport, for example. As shown, there are four voids 118 provided on the bottom of the body 102 of the base 100. The number of voids 118 and/or the shapes and sizes of the voids can be changed to achieve a desired effect. For example, the number of voids 118 may be greater or less than the four voids shown in the drawings. Further, the voids 118 may include a unique shape to enable the bases 100 to be stacked on covers 104 having protrusions that are sized to fit within the voids, which will be described in greater detail below during the description of the cover. The arrangement is such that the base 100 of one automated pallet container can be secured to the cover of another automated pallet container to positively stack the automated pallet containers on one another.

Referring particularly to FIGS. 4 and 6, in one embodiment, the base 100 further includes several motors, each indicated at 120, provided on the bottom of the body 102 of the base to drive the movement of the wheels or casters 110. The provision of the motors 120 enable the base to move autonomously under the control of a controller wirelessly coupled to the base 100. As shown, four such motors 120 are provided, one for each wheel or caster 110, to drive the movement of the wheels or casters. The locations of the motors 120 can be manipulated to optimize the drive of their respective wheel or caster 110. In another embodiment, the motors 120 can embody electromagnetic motors, it being understood that any type of motor can be employed to drive the wheels or casters 110 of the base 100. In one embodiment, each motor 120 can embody a power storage device, such as a battery, to drive the movement of the wheels or casters 110.

Referring to FIGS. 7-13, the construction of the cover 104 is shown in greater detail, particularly with respect to the manner in which the cover is secured the base 100. As shown, the cover 104 includes a top 130, two short sides 132, 134, and two long sides 136, 138, with each side being hingedly secured to the top. The short sides 132, 134 of the cover 104 correspond in width to the short sides of the body 102 of the base 100 and the long sides 136, 138 of the cover correspond in width to the long sides of the body of the base. As with the base 100, the cover 104 may be fabricated from a variety of materials, such as metal, carbon fiber and/or plastic. The arrangement is such that the cover 104 can achieve an enclosure configuration in which the cover encloses product supported by the base 100. The cover 104 further can achieve a flattened configuration (FIG. 13) in which the top 130 and the four sides 132, 134, 136, 138 are coplanar and can lie on a horizontal surface. The manner in which each side 132, 134, 136, 138 is secured to the top 130 can be achieved by a mechanical hinge or a flexible hinge, or some combination thereof.

Figure 9:
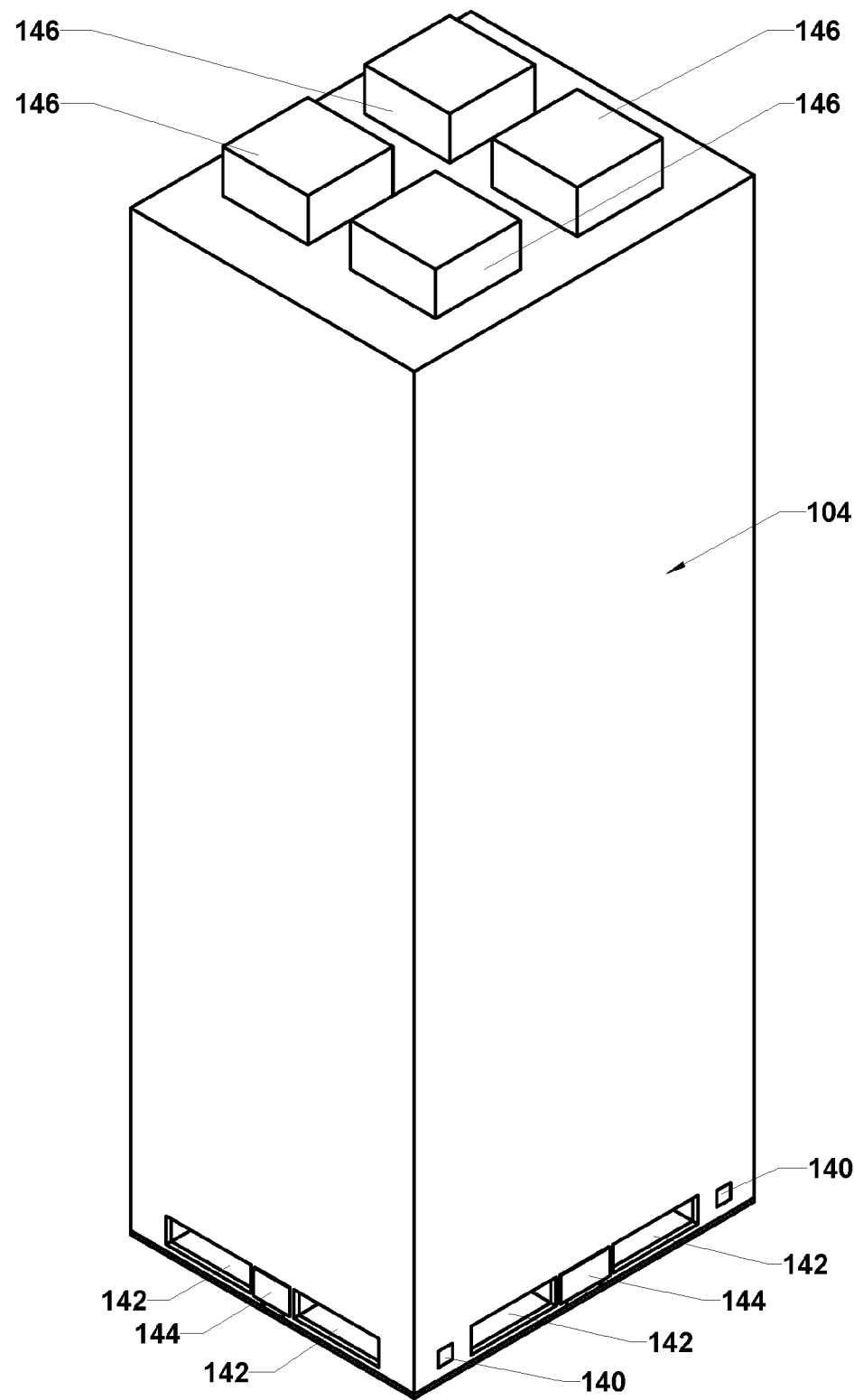
FIG. 9 is a top perspective view of the automated pallet container.
Figure 10:
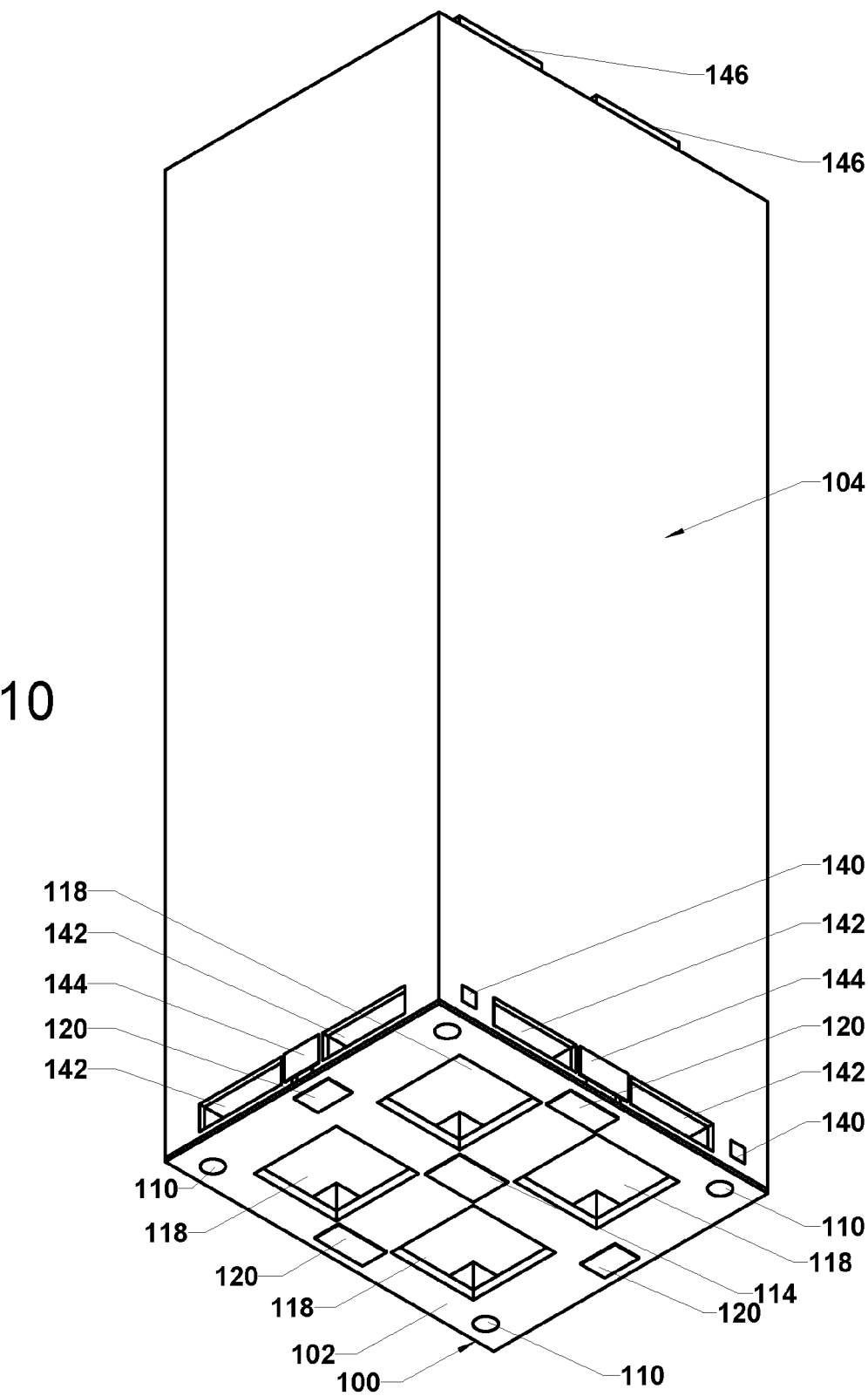
FIG. 10 is a bottom perspective view of the automated pallet container.
Figure 11:
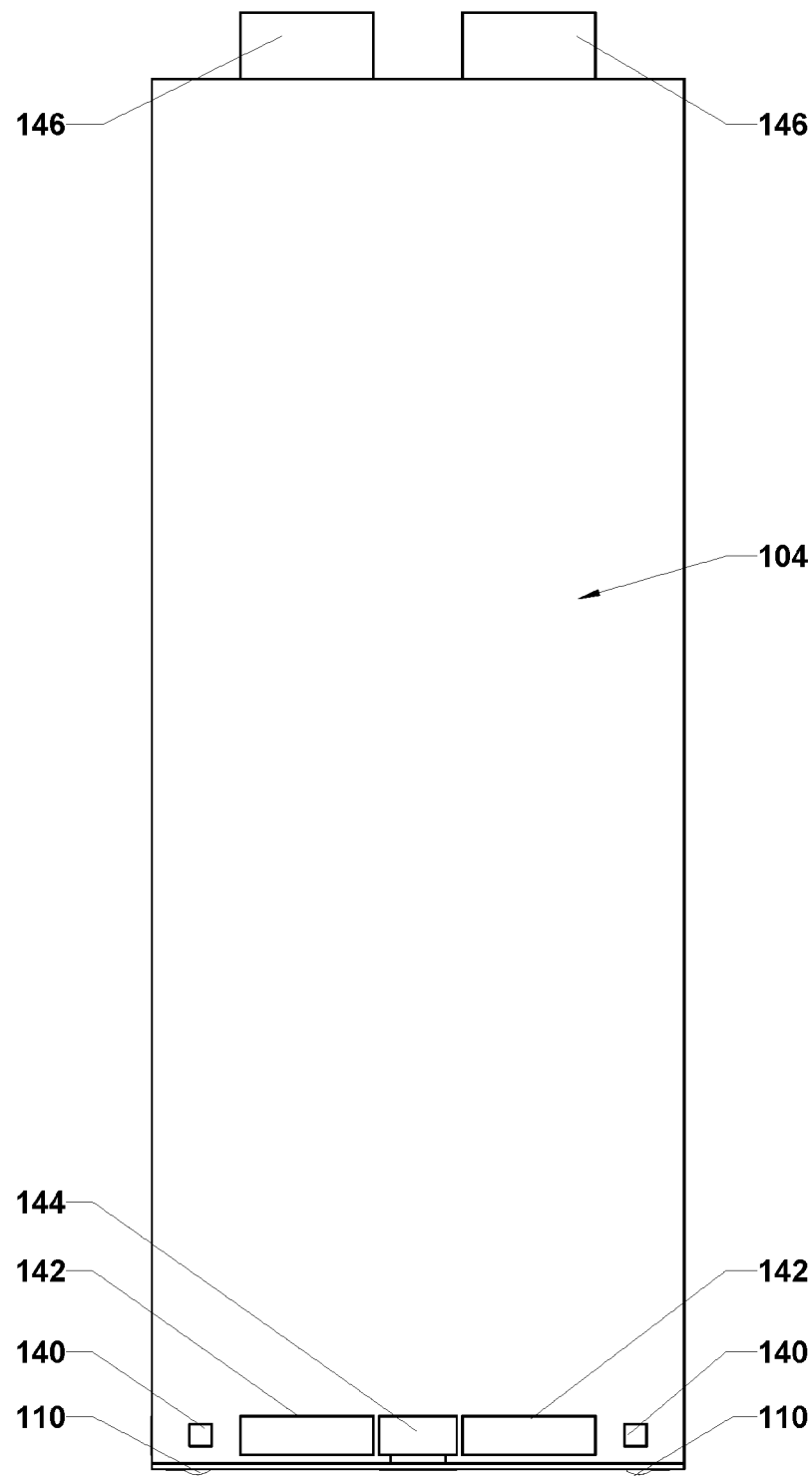
FIG. 11 is a front elevation view of the automated pallet container.
Figure 12:
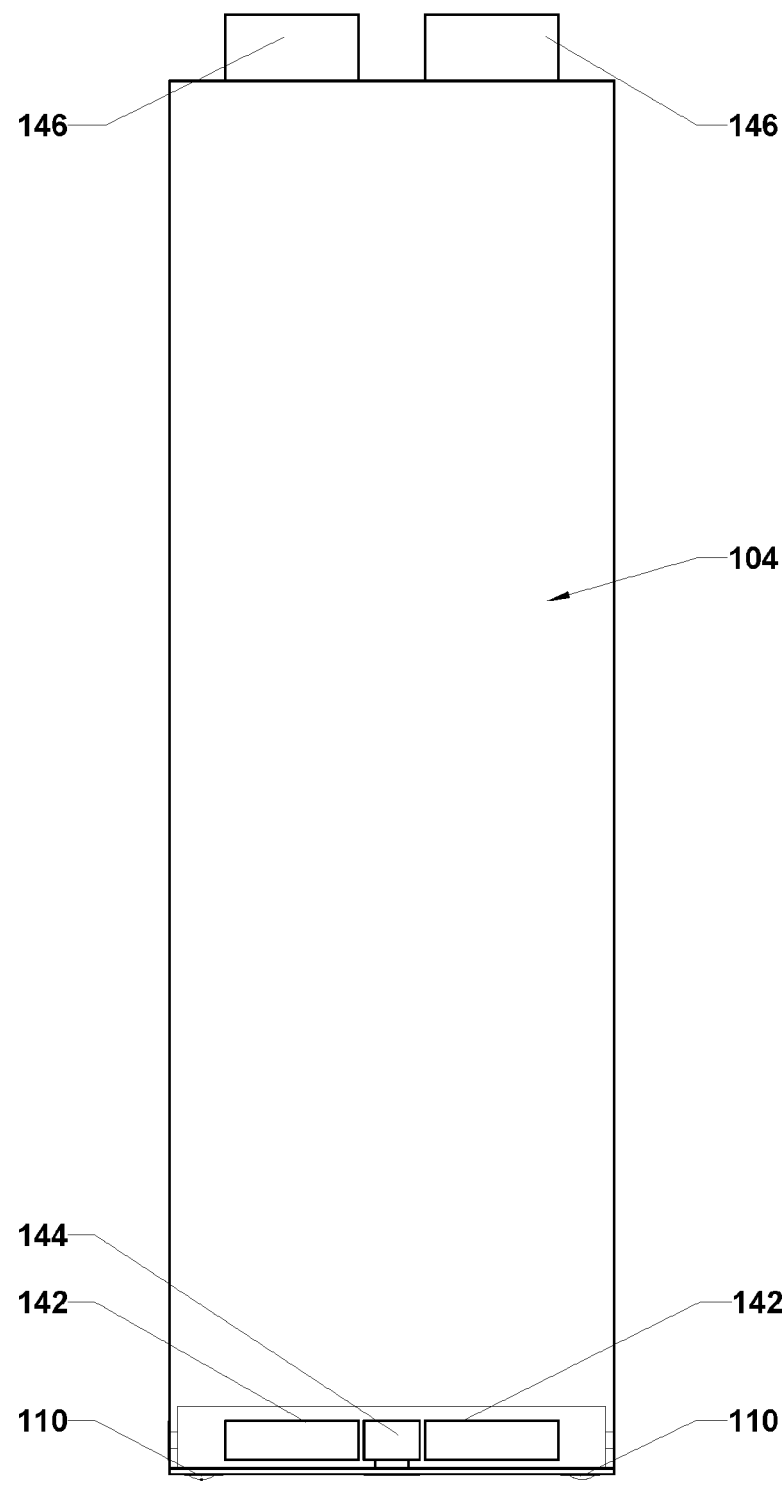
FIG. 12 is a side elevation view of the automated pallet container.
Figure 13:
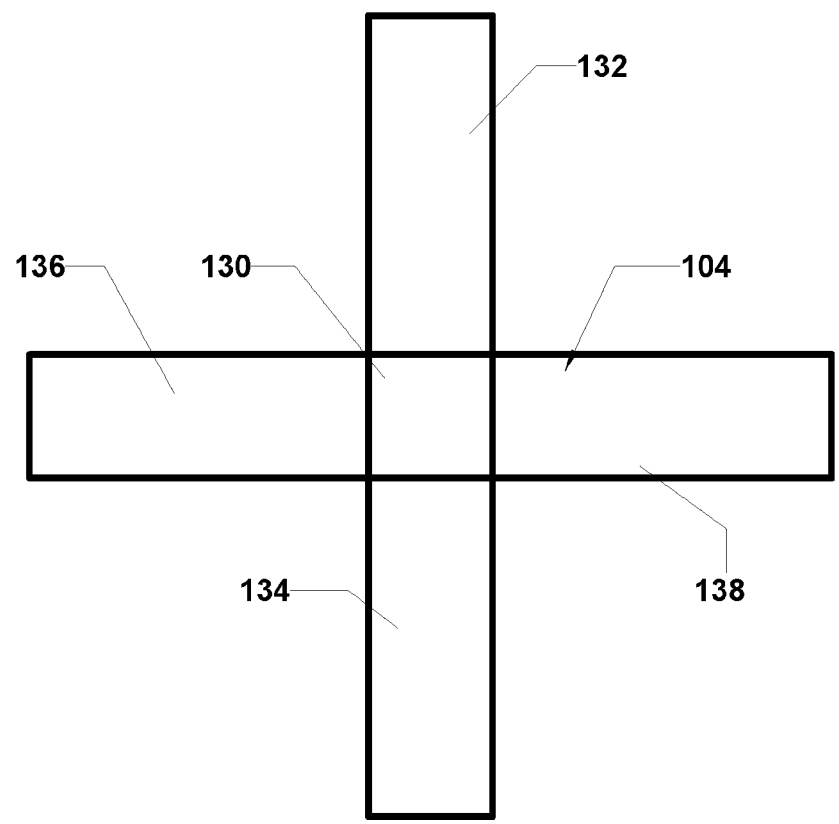
FIG. 13 is a top plan view of a cover of the automated pallet container removed from the base and in flattened form.

Referring particularly to FIGS. 9 and 10, in one embodiment, the cover 104 further includes interlocking features, each indicated at 140, located on the sides 132, 134, 136, 138 of the cover. As described above, interlocking features 140 are provided to releasably secure the cover 104 to the base 100. In one embodiment, the interlocking features 140 include openings formed in the cover 104 that are configured to receive the interlocking features 108, e.g., rectangular elements, on the sides of the base. The shape and size of each opening can be selected to achieve a particular purpose. For example, the openings can be square-shaped and configured to receive square-shaped elements of the base 100. As described above, in other embodiments, the interlocking features 108, 140 of the base 100 and the cover 104, respectively, can include magnets having polarities that are attracted to one another when placed proximate to one another.

Referring to particularly FIGS. 9 and 10, in one embodiment, the cover 104 further includes openings, each indicated at 142, formed on each side 132, 134, 136, 138 of the cover to enable the forks of the forklift described above to enter the openings 112 of the base 100. As shown, the openings 142 of the cover 104 correspond to the openings 112 of the base 100, with each opening 142 including an elongate rectangular-shaped void that is sized to receive forks of the forklift therein. As described above, the openings 142 provided on the sides 132, 134, 136, 138 of the cover 104 are spaced from one another in the traditional manner to receive the forks of the forklift.

Referring particularly to FIGS. 9-13, in one embodiment, the cover 104 further includes several notches, each indicated at 144, formed along bottom edges of the sides 132, 134, 136, 138 of the cover to provide access to the mechanical or electromechanical devices 116 provided on the sides of the body 102 of the base 100. The notches 144 enable the devices 116 of the base 100 to be releasably secured to adjacent bases during storage or transport, for example. The locations and the positions of the notches 144 correspond to the locations of the devices 116 when securing the cover 104 to the base 100.

Referring particularly to FIG. 9, in one embodiment, the cover 104 includes several protrusions, each indicated at 146, provided on the top 130 of the cover. Each protrusion 146 is sized and shaped to be received with a respective void 118 of the bottom of the body 102 of the base 100. The provision of the protrusions 146 is to enable the stacking of fully assembled automated pallet containers with one another during storage or transport, for example. As shown, there are four protrusions 146 provided on the top 130 of the cover 104. The number of protrusions 146 and the shapes and sizes of the protrusions can be changed to achieve a desired effect. For example, three protrusions can be provided or the protrusions may include a unique shape to enable the cover to receive bases to be stacked on covers having the same unique shape voids. As described above, the arrangement is such that the base 100 of one automated pallet container can be secured to the cover 104 of another automated pallet container to positively stack the automated pallet containers on one another.

Figure 14:
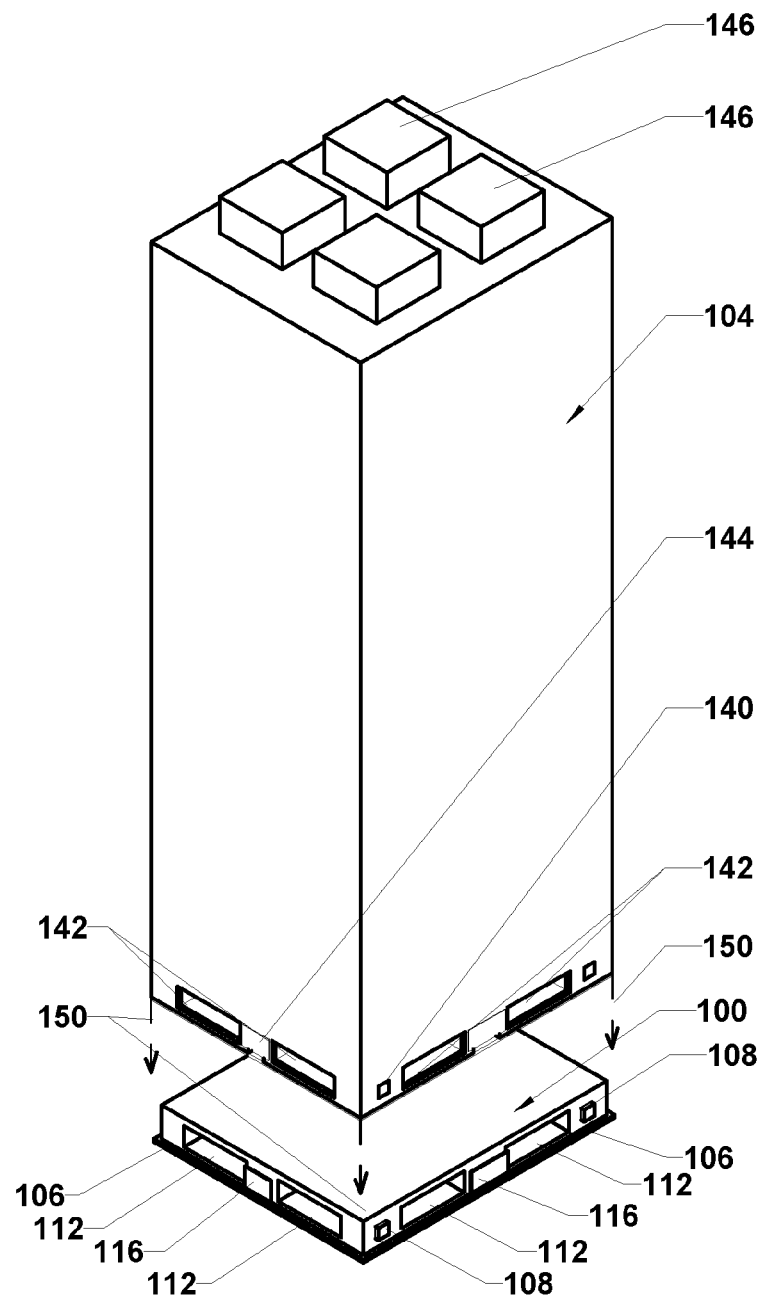
FIG. 14 is a perspective view of the cover being placed on the base to form the automated pallet container.
Figure 15:
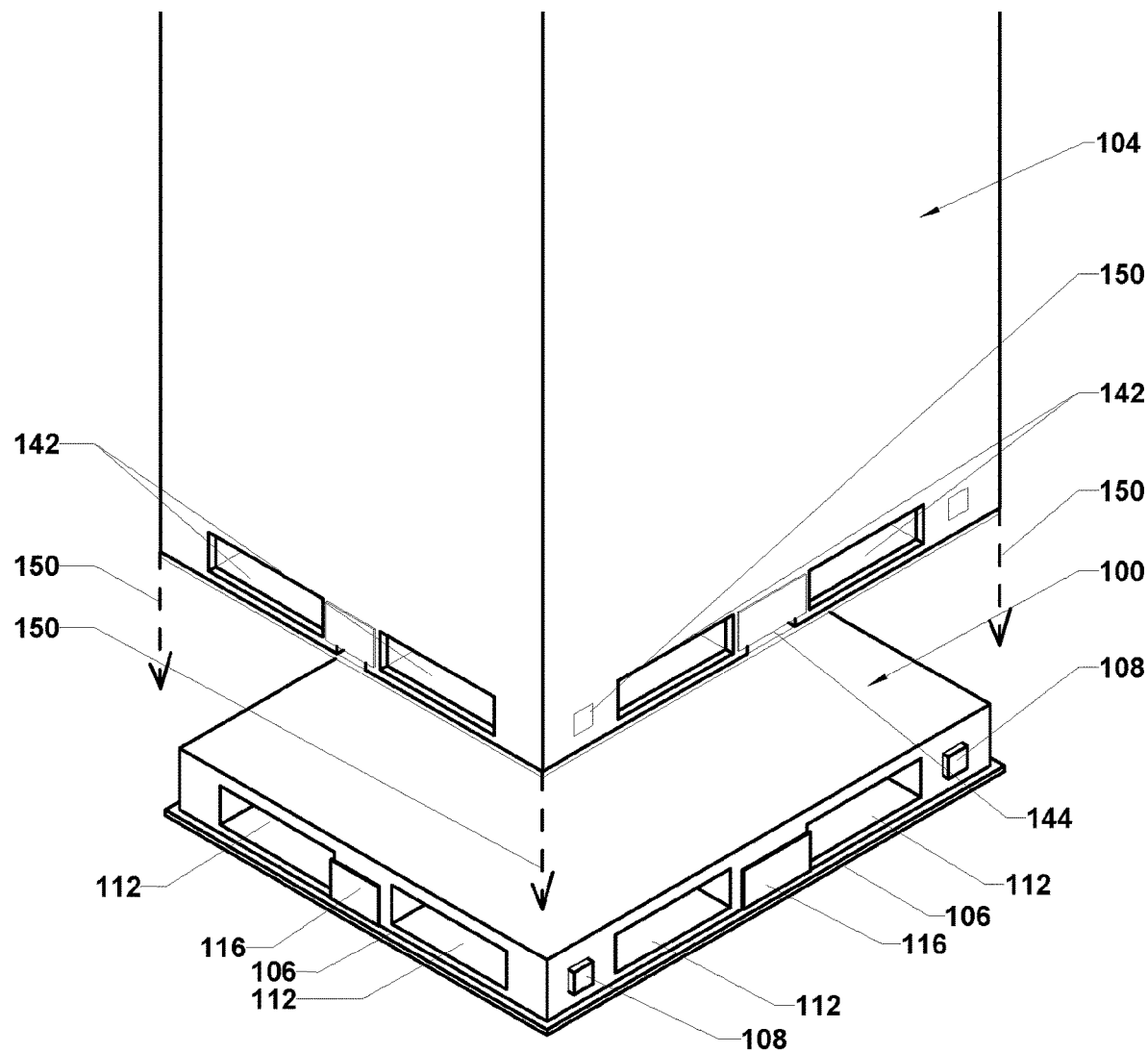
FIG. 15 is an enlarged perspective view of a bottom portion of the cover and the base shown in FIG. 14.
Figure 16:
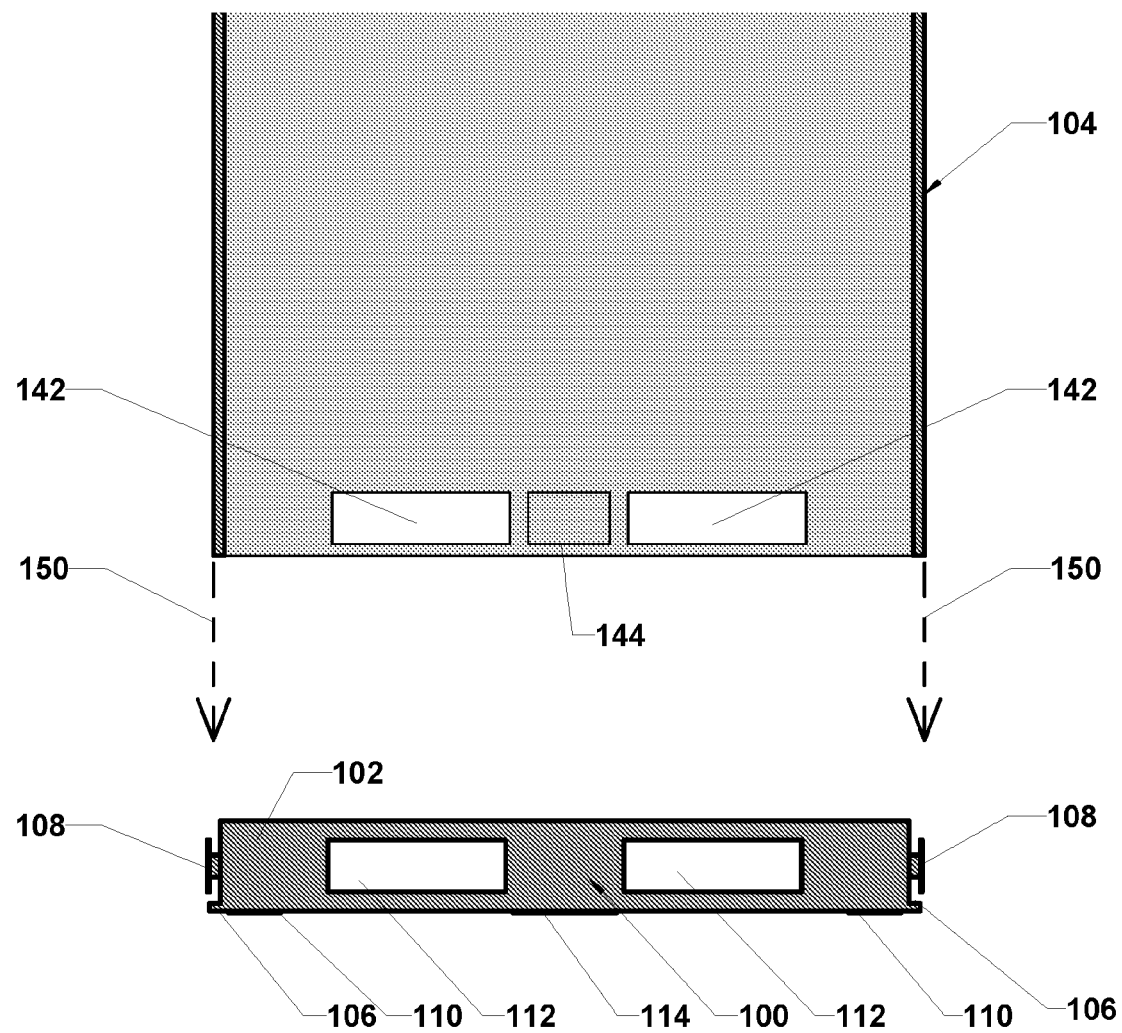
FIG. 16 is a cross-sectional view of the cover being placed on the base to form the automated pallet container.

Referring to FIGS. 14-16, the manner in which the cover 104 is secured to the base 100 is shown in greater detail. Each drawing shows the cover 104 spaced from the base 100 prior to being secured to the base, with downward movement of the cover with respect to the base being indicated at 150. As shown, the short sides 132, 134 of the cover 104 are aligned with the short sides of the body 102 of the base 100 and the long sides 136, 138 of the cover are aligned with the long sides of the body of the base. The arrangement is such that the lower edges of the sides 132, 134, 136, 138 are received on the lips 106 of the body 102 of the base 100 in a position that the openings 142 of the cover and the openings 112 of the base are aligned to enable the forks of the forklift to access the base for transport and/or movement. Also, the interlocking features 140 of the cover 104, e.g., openings, are aligned with the interlocking features 108 of the base 100, e.g., rectangular elements, to releasably secure the cover to the base. Further, the notches 144 enable access to the mechanical or electromagnetic devices 116 to enable the bases 100 of adjacently positioned automated pallet containers to be secured to one another.

Figure 17:
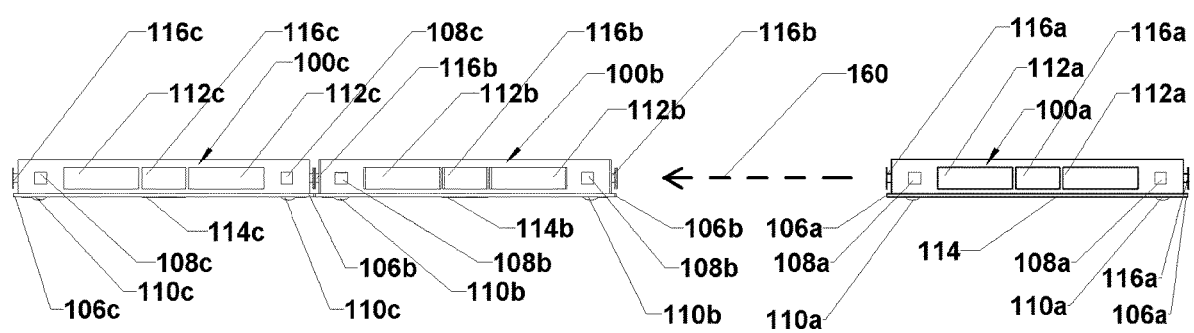
FIG. 17 is an elevation view of two interlocked bases and a third base interlocking with the group.

Referring to FIG. 17, the manner in which a base 100a is secured to an adjacent base 100b is illustrated, with base 100b being already secured to base 100c. As shown, the base 100a moves laterally along a horizontal surface toward the adjacent base 100b. This movement is indicated at 160. The arrangement is such that the mechanical or electromechanical device 116a of the base 100a is aligned with the mechanical or electromechanical device 116b of the adjacent base 100b to secure the base 100a to the adjacent base 100b. The devices 116a, 116b are configured to be releasably secured to one another to secure the bases 100a, 100b, respectively, during storage or transport, for example. The devices 116a, 116b further are configured to be released from one another to enable the base 100a to be removed from the adjacent base 100b. As described above, the locations and the positions of the devices on the sides of the base can be manipulated and changed to achieve a desired effect, while other devices can be provided, such as magnetic devices.

Figure 18:
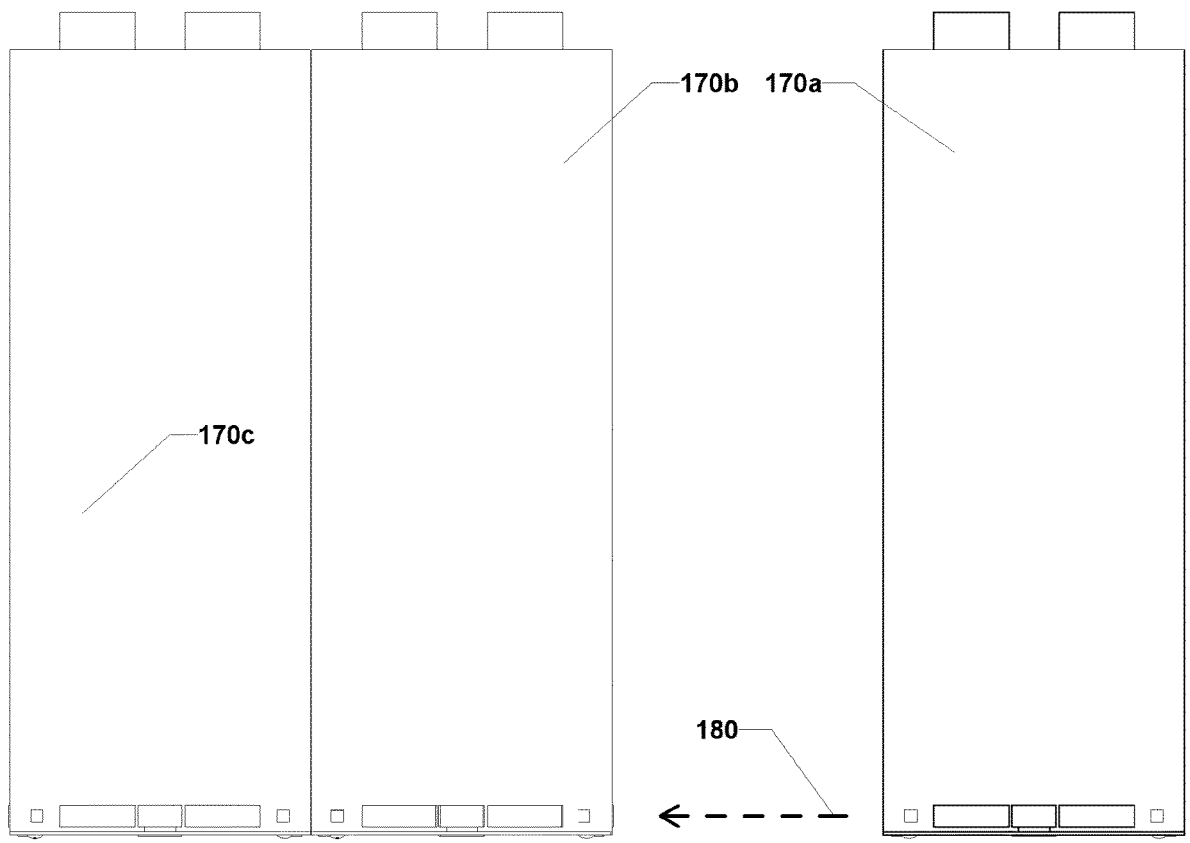
FIG. 18 is an elevation view of two interlocked automated pallet containers and a third automated pallet container interlocking with the group.

Referring to FIG. 18, the manner in which an automated pallet container, generally indicated at 170a, is connected to an adjacent automated pallet container, generally indicated at 170b, is illustrated, with the automated pallet container 170b being already secured to automated pallet container 170c. As shown, the automated pallet container 170a is moved laterally along a horizontal surface toward the adjacent automated pallet container 170b. This movement is indicated at 180. The arrangement is such that the mechanical or electromechanical device of the base of the automated pallet container 170a is aligned with the mechanical or electromechanical device of the base of the adjacent automated pallet container 170b to secure the automated pallet container to the adjacent automated pallet container. As described with reference to FIG. 17, the devices are configured to be releasably secured to one another to secure the automated pallet containers 170a, 170b to one another during storage or transport, for example. The devices further are configured to be released from one another to enable the automated pallet container 170a to be removed from the adjacent automated pallet container 170b.

Figure 19:
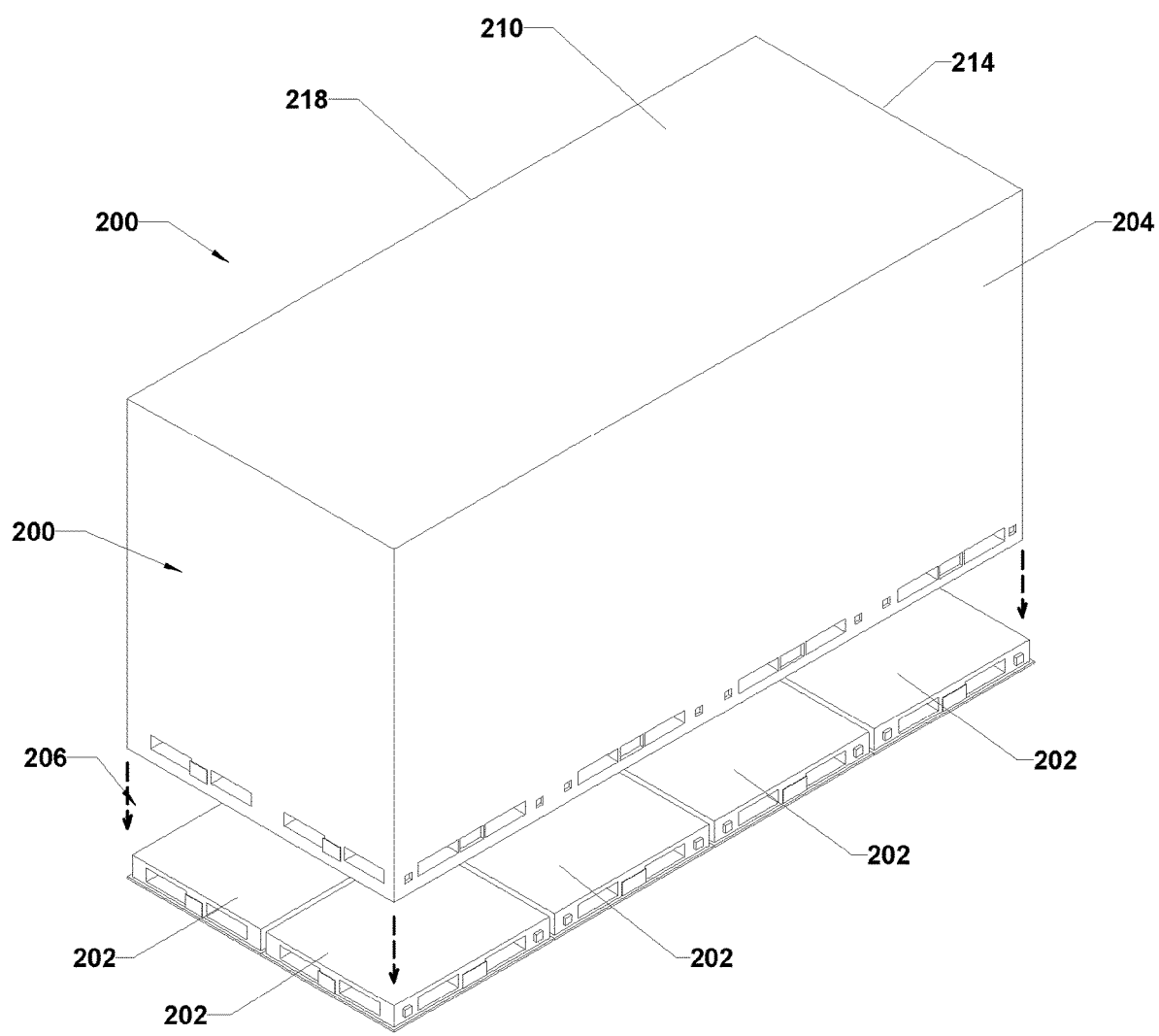
FIG. 19 is a perspective view of multiple interlocked bases with a larger cover.
Figure 20:
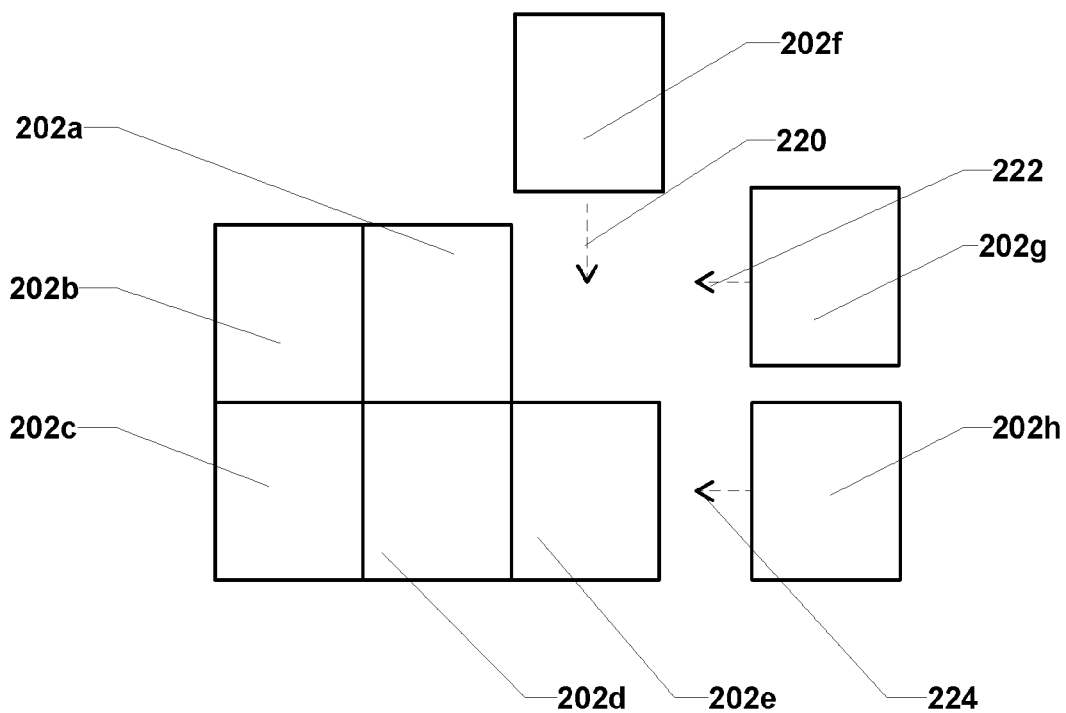
FIG. 20 is a top plan view of multiple bases connected to one another a larger base.

Referring to FIGS. 19 and 20, and particularly to FIG. 19, an embodiment of an automated pallet container is generally indicated at 200. As shown, the automated pallet container 200 includes several bases, each indicated 202, and a relatively large cover, indicated at 204. The cover 204 is illustrated spaced from the bases, with the motion of the cover being indicated at 206. In the shown embodiment, there are eight bases 202 provided, and the cover 204 is sized and shaped to accommodate the number of bases. It should be understood that the cover 204 can be constructed to enclose any number of bases, and that the shown embodiment is exemplary only.

Referring particularly to FIG. 19, in one embodiment, the cover 204 includes a top 210, two short sides 212, 214, and two long sides 216, 218, with each side being hingedly secured to the top. The short sides 212, 214 of the cover 204 correspond in width to the sides defined by two bases 202 and the long sides 216, 218 of the cover correspond in width to the sides defined by four bases 202. The arrangement is such that the cover 204 can achieve an enclosure configuration in which the cover encloses product supported by the bases 200. As with cover 104, the cover 204 further can achieve a flattened configuration (not shown) in which the top 210 and the four sides 212, 214, 216, 218 are coplanar and can lie on a horizontal surface. The manner in which each side 212, 214, 216, 218 is secured to the top 210 of the cover 204 can be achieved by a mechanical hinge or a flexible hinge.

Referring particularly to FIG. 20, the bases 202 of the automated pallet container shown in FIG. 19 are illustrated prior to being secured to one another. As shown, five bases 202a-202e are secured to one another in the manner described above and three bases 202f-202h are spaced from the five assembled bases 202a-202e. To secure the remote bases 202f-202h to the assembled bases 202a-202e, the remote bases are moved as indicated at 220, 222, 224, respectively, until the remote bases are adjacent and secured to the assembled bases. The positions of the assembled bases 202a-202e and the remote bases 202f-202h are for illustration purposes only to show how the bases are assembled together.

Figure 21:
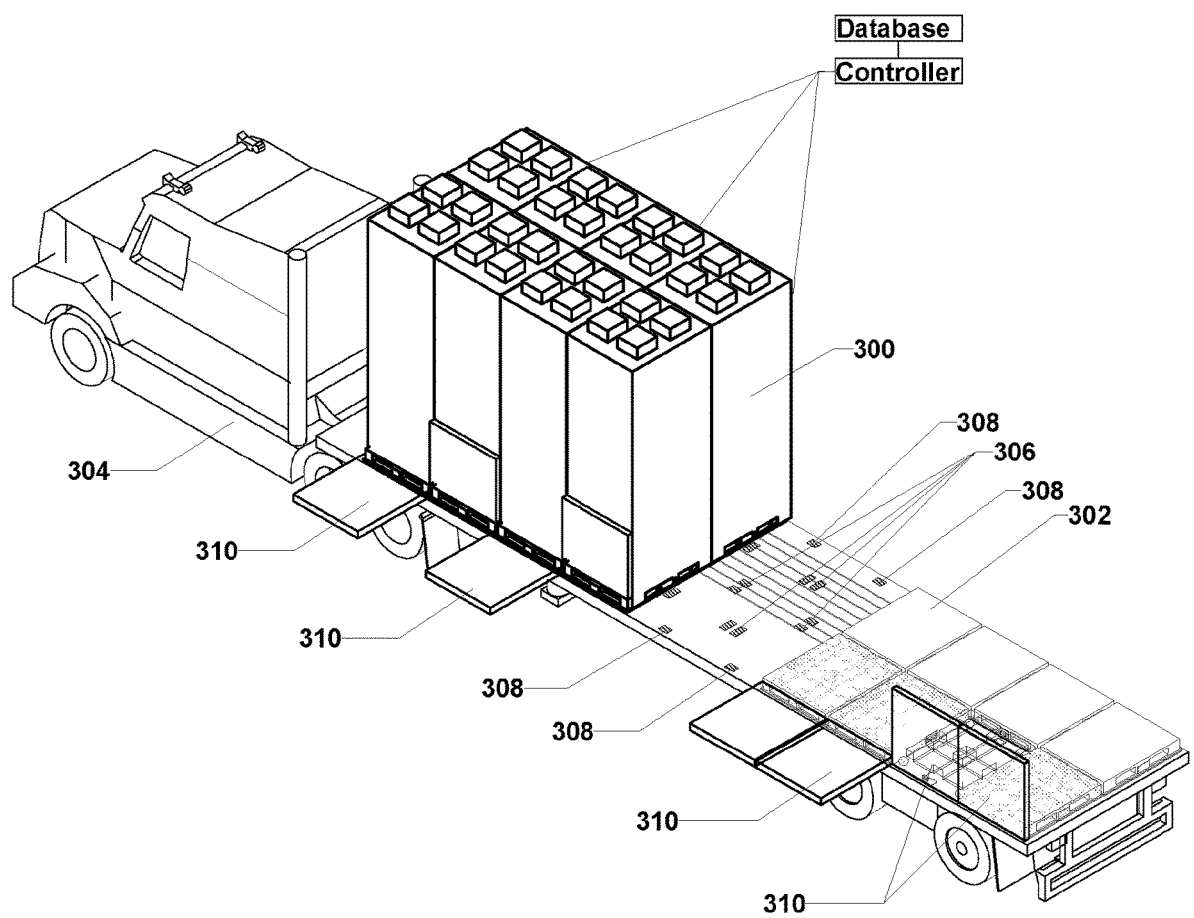
FIG. 21 is a perspective view of multiple automated pallet containers and loaded on a vehicle.
Figure 22:
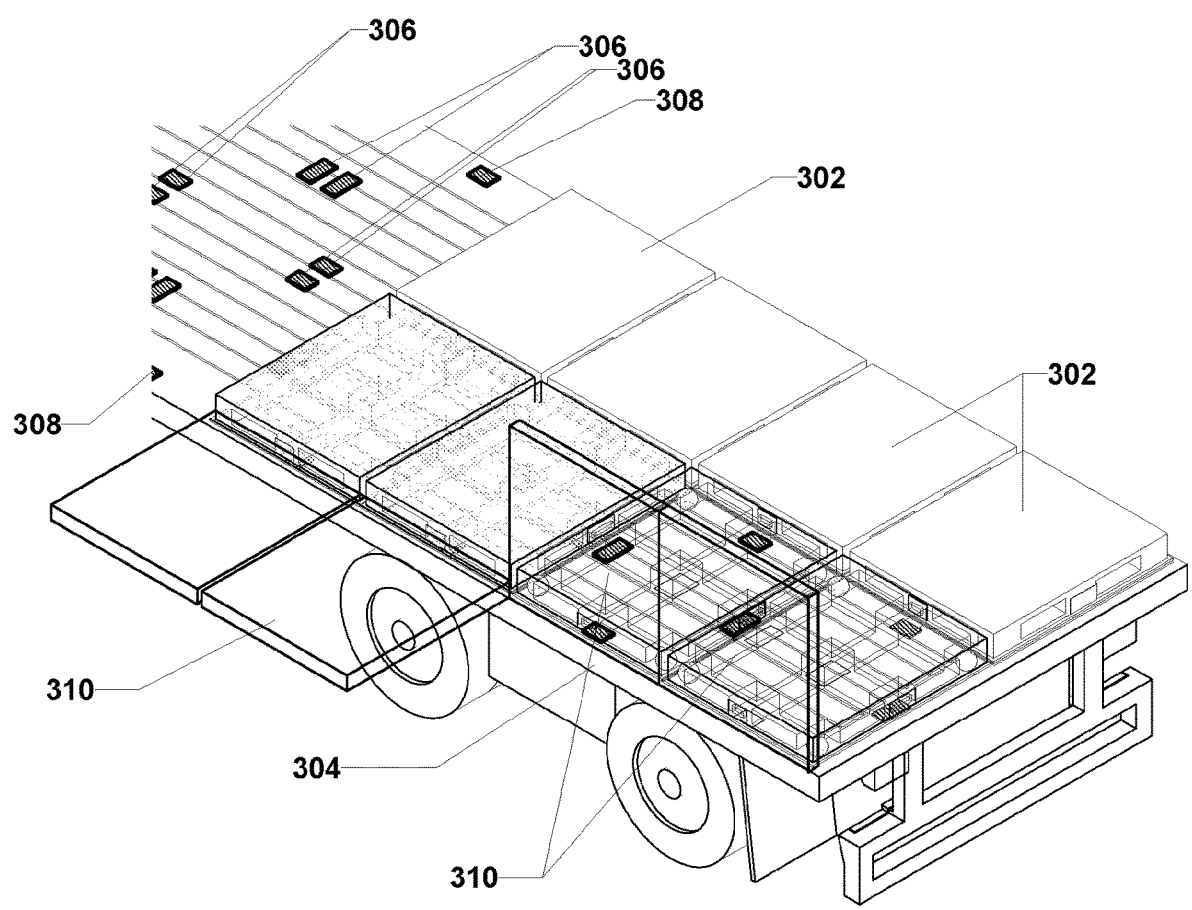
FIG. 22 is a perspective view of multiple bases loaded on the vehicle.

Referring to FIGS. 21 and 22, several automated pallet containers, each indicated at 300, and several bases, each indicated at 302, are shown being loaded on a vehicle 304, such as a tractor trailer. In one embodiment, the bases are the same as base 100 and the automated pallet container is the same as the automated pallet container formed by base 100 and cover 104. Although a tractor trailer 304 is illustrated, it should be understood that the vehicle can embody any type of vehicle used to transport containers. For example, the vehicle can include a tractor trailer having a chassis without a bed or cover. As shown, the vehicle includes several interlocking mechanisms, each indicated at 306. The interlocking mechanisms 306 are shown on the vehicle 304, e.g., on the bed of the tractor trailer, and are configured to mate with interlocking mechanisms provided on the bottoms of the bases of the automated pallet containers to secure the automated pallet containers in place during transport. The interlocking mechanisms 306 can embody any number of fastening devices that are suitable to connect and secure the bases 302 of the automated pallet containers 300 to the vehicle 304.

The vehicle 304 further includes several electromagnetic devices, each indicated at 308, provided on the vehicle, e.g., on the bed of the tractor trailer, and are configured to provide a magnetic field for the electromagnetic devices 114 provided on the bottoms of the bodies 102 of the bases 100 of the automated pallet containers 300 to guide the automated pallet containers on and off the vehicle. As shown, the electromagnetic devices 308 are located near edges of the vehicle 304, e.g., adjacent edges of the bed of the tractor trailer. The number of electromagnetic devices 308 and the sizes of the electromagnetic devices can be varied depending on the sizes and weights of the automated pallet containers 300.

Still referring to FIGS. 21 and 22, in some embodiments, the vehicle further includes several hinged flaps, each indicated at 310, to provide structures to bridge gaps between the vehicle 304 and a belt conveyor system when the automated pallet containers 300 are moved laterally between the vehicle and the belt conveyor system. As shown, each flap 310 is configured to be moved to and from a generally vertical position in which the flap is positioned against the automated pallet container 300 and a generally horizontal position in which the flap extends horizontally away from the vehicle 304. The number of flaps 310 can be provided based on the number of automated pallet containers 300 supported by the vehicle 304. In one embodiment, a width of a flap 310 is generally the same as a width of the automated pallet container 300. In some embodiments, the flap 310 can function as a lift gate where the flap can move vertically to carry the automated pallet container 300 from the bed of the vehicle 304 to ground level and vice versa.

Figure 23:
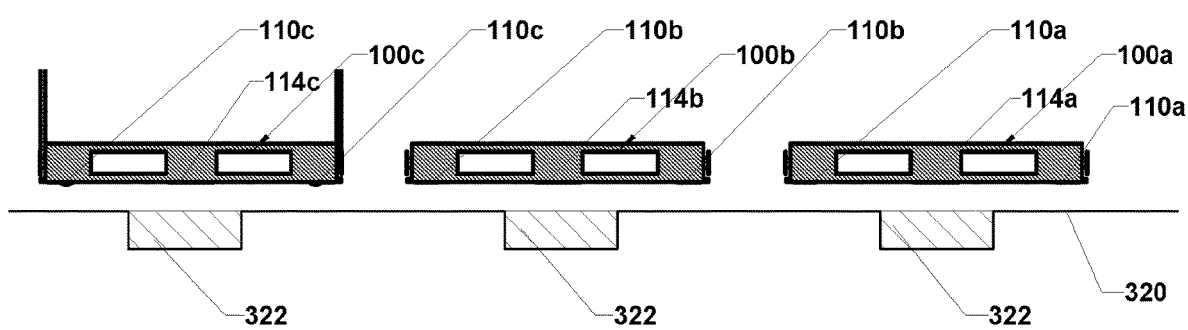
FIG. 23 is a cross-sectional view showing self-propulsion of the automated pallet container with an onboard motor.

Referring to FIG. 23, several features of the automated pallet container of the present disclosure are illustrated. As shown, three bases 100a, 100b, 100c are illustrated spaced apart from one another and spaced from a floor 320 of a facility, for example. Each base 100a, 100b, 100c includes wheels or casters 110a, 110b, 110c that enable the base to move along the floor 320. As described above, each base 100a, 100b, 100c can include a motor (not designated) to power the movement of the base along the floor 320 in a desired direction and/or destination. The wheels or casters 110a, 110b, 110c can embody any type of device capable of enabling the base 100a, 100b, 100c, respectively, to roll or move along a relatively flat surface.

Each base 100a, 100b, 100c further includes the electromagnetic device 114a, 114b, 114c, respectively, to guide the base of the automated pallet container along the floor 320. As shown, the floor includes a magnetic guidance system 322, which, in one embodiment, is embedded into the floor 320 of the facility. The polarities of the electromagnetic device 114a, 114b, 114c and/or the magnetic guidance system 322 can be manipulated as by a controller to guide the base 100a, 100b, 100c of the automated pallet container to the desired direction and/or destination. Although the floor 320 is described as being part of a facility, the floor can be part of any structure on which the automated pallet container operates. In the shown embodiment, each base 100a, 100b, 100c is configured to move in parallel in a direction along a length of the magnetic guidance system 322.

Figure 24:
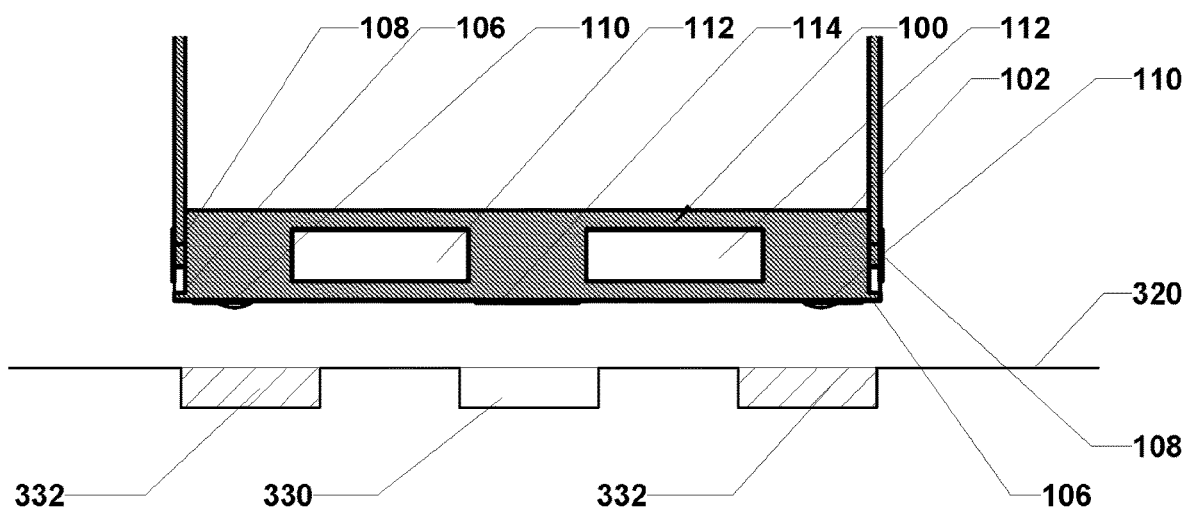
FIG. 24 is a cross-sectional view showing magnetic levitation and motion of the automated pallet container.

Referring to FIG. 24, as described above, the wheels, casters or rollers 110 provided on the bottom of the body 102 of the base 100 can be substituted or supplemented with electromagnetic levitation technology capable of dynamic stability coupled with a magnetic propulsion and guidance system (such as a linear induction motor) built into the floor 320 of the facilities in which the automated pallet containers operate. As shown, the floor 320 includes a linear induction motor 330 that is embedded into the floor of the facility. The linear induction motor 330 cooperates with the base 100 of the automated pallet container to enable the base of the automated pallet container to move with respect to the floor.

The floor 320 further includes levitation magnets, each indicated at 322, which in the shown embodiment is embedded into the floor of the facility. As described above, the levitation magnets 322 enable the base 100 to levitate at a desired space above the floor 320 to enable the movement of the base of the automated pallet container by the linear induction motor 330.

Either configuration allows an automated pallet container to move from the loading area of the facility to the distribution area where the automated pallet container can self-load onto the vehicle that transports the automated pallet container to its final destination.

Figure 25:
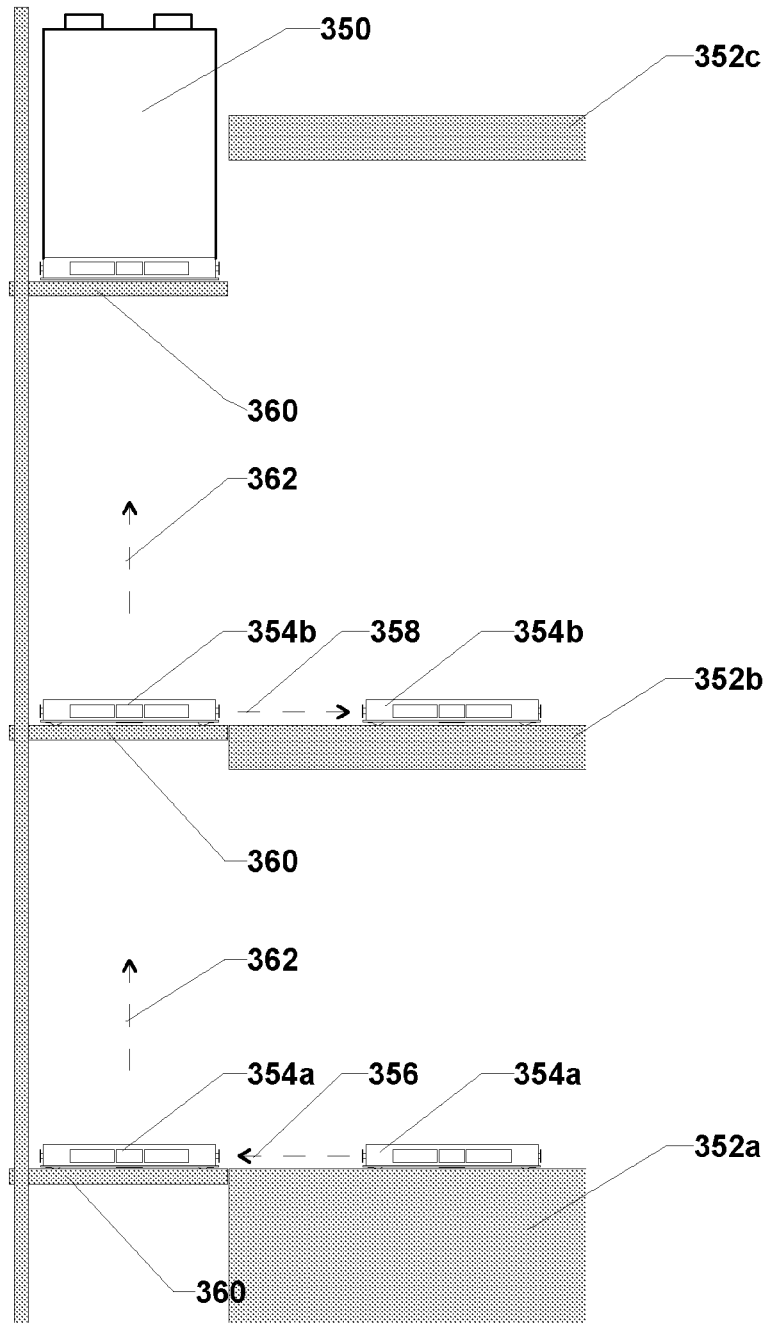
FIG. 25 is a cross-sectional view of a facility showing vertical motion of bases and automated pallet containers on lifts.

Referring to FIG. 25, an automated pallet container 350 of embodiments of the present disclosure is capable of being moved vertically in addition to the previously described horizontal movement with respect to several floors of a facility, which are indicated 352a, 352b, 352c. As shown, horizontal movements of bases 354a, 354b is illustrated at 356, 358, respectively. The horizontal movement can result in the movement of the base of the automated pallet container from the floor, e.g., floor 352a, of the facility to a lift 360 of the facility. The lift 360 can take to form of any mechanism, such as an elevator, that moves vertically within the facility. Once the base 354a of the automated pallet container is positioned on the lift 360, the lift can move the base vertically from one floor to another floor, e.g., from floor 352a to floors 352b, 352c. This vertical movement is indicated at 362. The lift 360 and the base 354a of the automated pallet container can be configured to secure the base on the lift during vertical movement of the lift within the facility.

Figure 26:
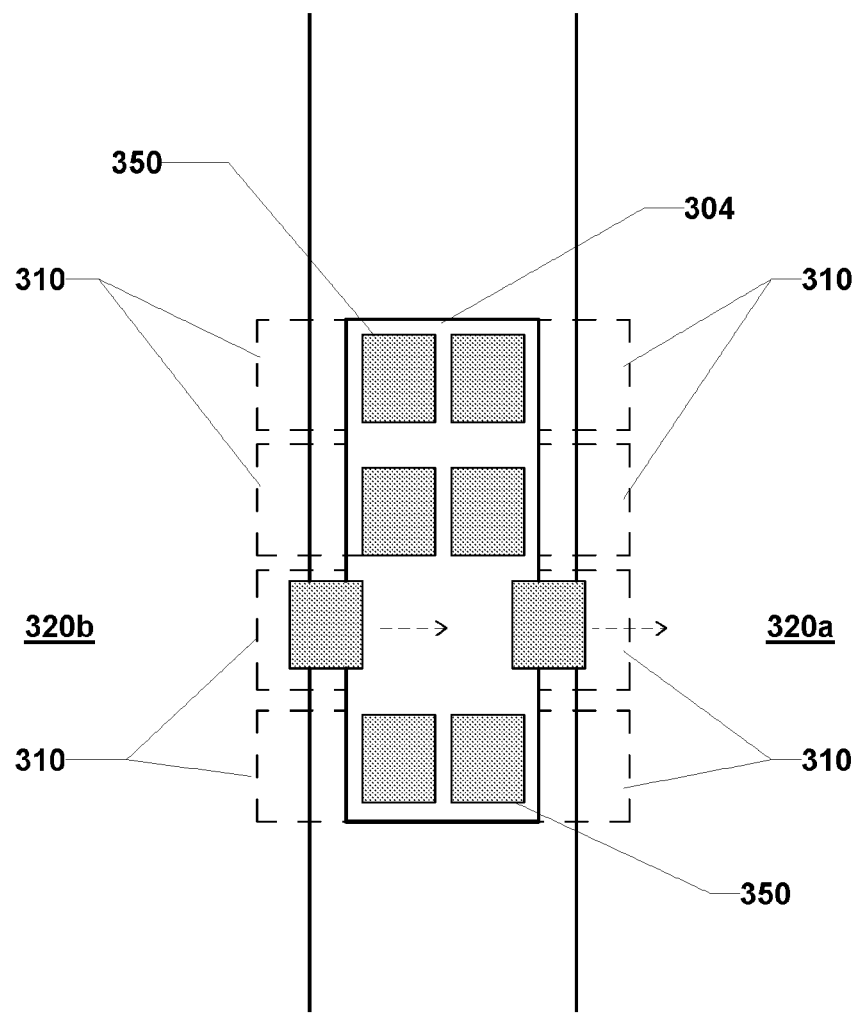
FIG. 26 is a top plan view of a transfer of automated pallet containers between the vehicle and a facility.
Figure 27:
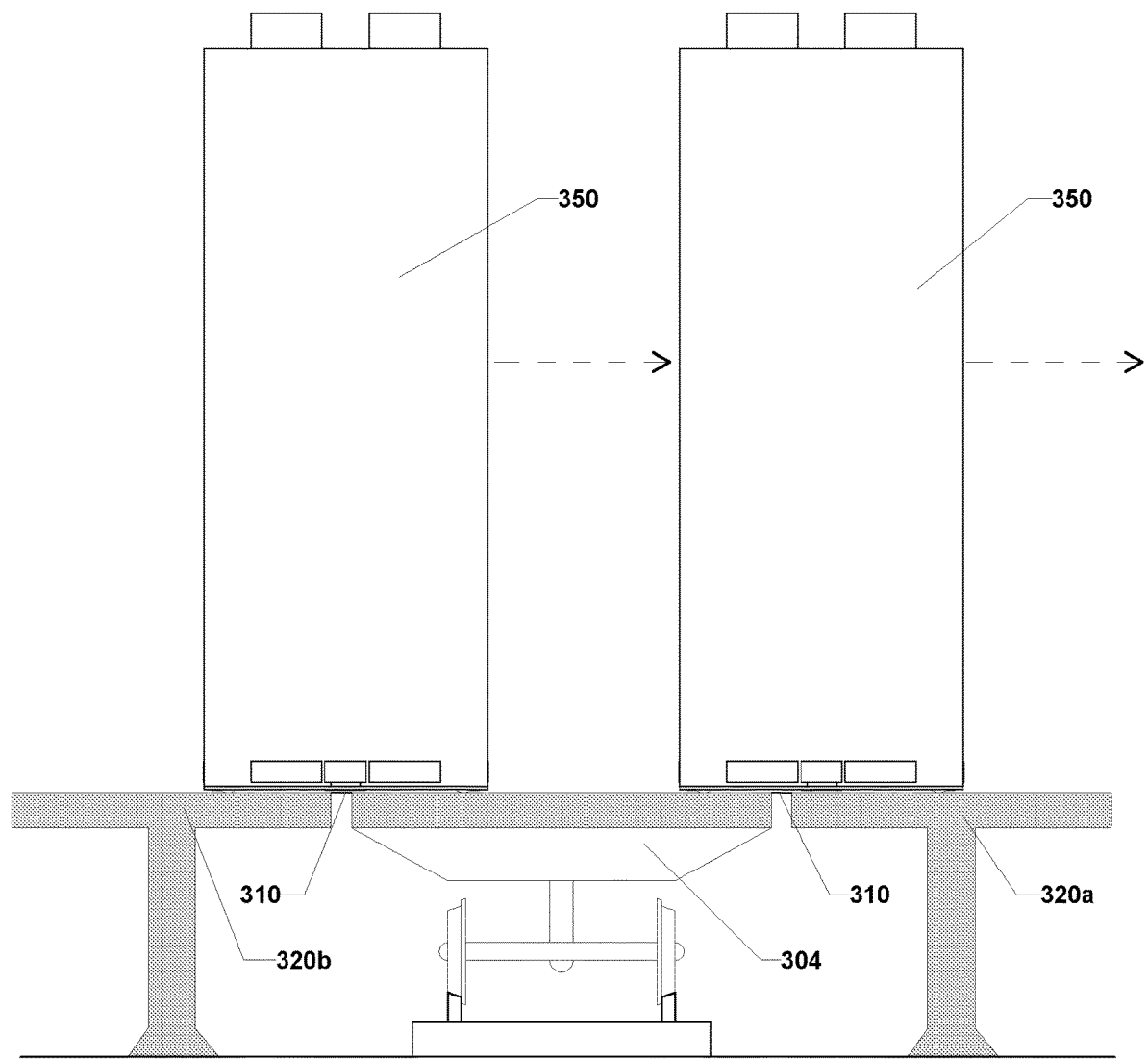
FIG. 27 is a cross-sectional view of a transfer of automated pallet containers between the vehicle and the facility.

Referring to FIGS. 26 and 27, the automated pallet container of embodiments of the present disclosure, e.g., automated pallet container 350, is capable of being moved to and from a vehicle, such as vehicle 304, to a facility. As shown, the vehicle 304 is positioned on a surface, such as a road or street or a throughway through a facility, that is disposed between floors 320a, 302b of a facility or of adjacent facilities. In one embodiment, the floors 320a, 320b can be raised platforms that are approximate the height of a bed of the vehicle 304. As described above, the vehicle 304 includes hinged flaps 310 to bridge the gaps between the vehicle and the floors 320a, 320b of the facility. In another embodiment, the floors 320a, 320b of the facility include belt conveyor systems, with each belt conveyor system being configured to move automated pallet containers 350 along the floor of the facility. Each hinged flap 310 is configured to be moved to and from a generally vertical position in which the flap is positioned against the automated pallet container 350 and a generally horizontal position in which the flap extends horizontally away from the vehicle 304. As shown in FIG. 27, the flaps 310 are shown in the lowered, generally horizontal position. The arrangement is such that once deployed, the hinged flaps 310 enable the automated pallet containers 350 to move themselves off of the bed of the vehicle 304 onto belt conveyor systems associated with the floors 320a, 320b of the facility. The belt conveyor systems can be configured to transport the automated pallet containers 350 to destinations within the facility.

Figure 28:
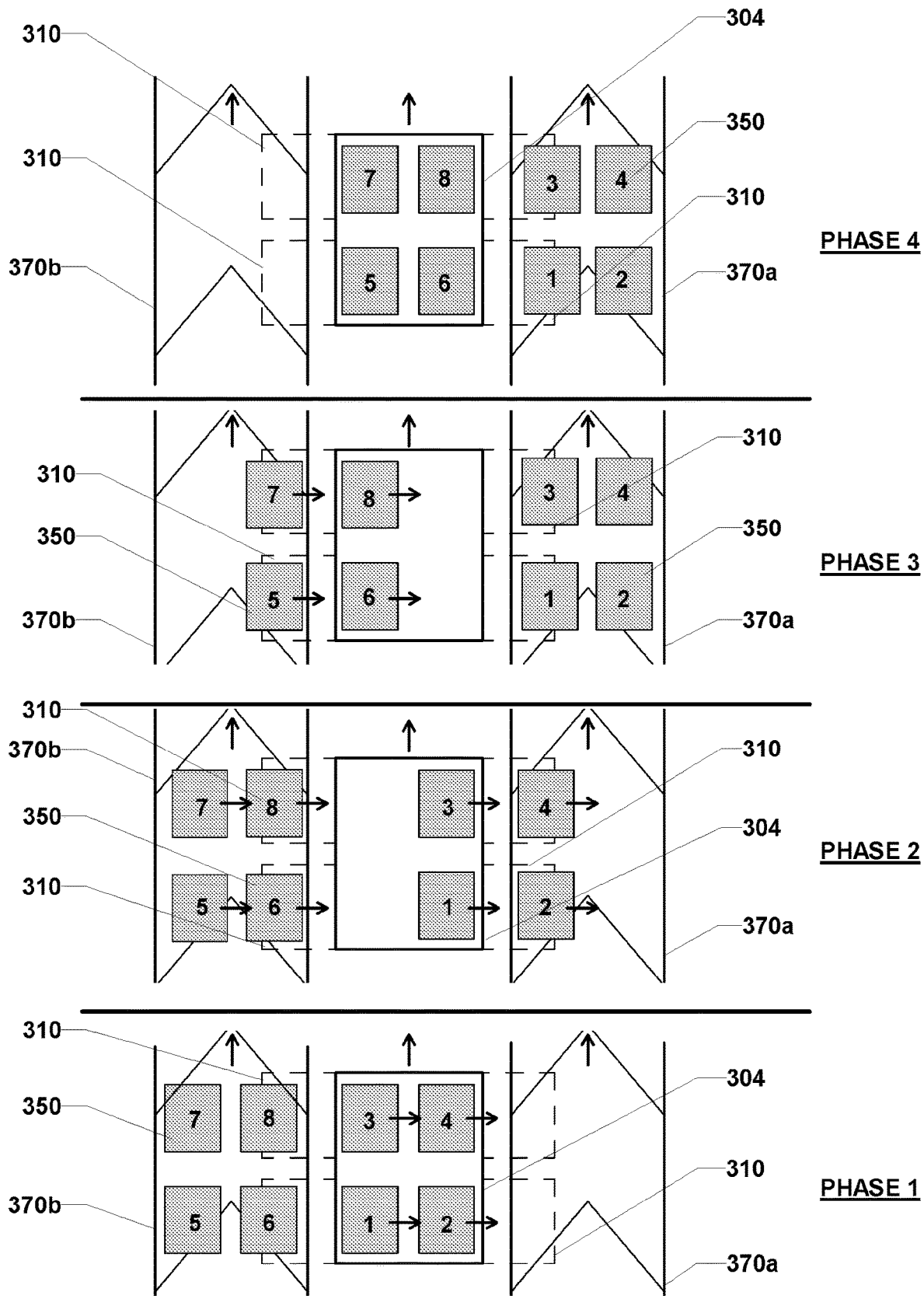
FIG. 28 is a top plan view of the vehicle transferring automated pallet containers to a belt conveyor system showing the position of the automated pallet container over four successive states.

Referring to FIG. 28, the automated pallet container of embodiments of the present disclosure, e.g., automated pallet container 350, is capable of being transported by belt conveyor systems associated with the facility. As shown, the facility includes belt conveyor systems 370a, 370b respectively. As shown, automated pallet containers 350 are transferred from a vehicle, e.g., vehicle 304, to the belt conveyor systems 370a, 370b of the facility.

Specifically, FIG. 28 shows a plan view of a vehicle moving through four sequential phases in a direction of the arrows between two belt conveyors. Belt conveyor 370a (outbound belt), on the left of the vehicle, contains outbound items leaving the facility on the vehicle; automatic pallet containers marked as 5, 6, 7 and 8. Belt conveyor 370b (inbound belt), on the right of the vehicle, is prepared to receive inbound items from the vehicle. In phase 1, the vehicle carrying automated pallet containers marked 1, 2, 3 and 4 enters the loading zone, the flaps come down and rest on both belts, they move at synchronized speed. The vehicle is now under the control of a fixed guideway in a manner similar as a car moving through a car wash for the entire trip through the loading zone. Automated pallet containers marked 5,6,7 and 8 moved by the outbound belt in sync with the vehicle. In phase 2, automated pallet containers marked 2 and 4 move themselves laterally to the right onto the inbound belt and automated pallet containers marked 1 and 3 move one position to the right on the vehicle shown in the next position, automated pallet containers marked 5, 6, 7 and 8 are in the same lateral position on the outbound belt but still moving forward on the outbound belt in sync with the vehicle. In phase 3 automated pallet containers marked 2 and 4 move further right on the inbound belt to allow automated pallet containers marked 1 and 3 to then move themselves right off the vehicle to the open position on the inbound belt, while automated pallet containers marked and 6 and 8 move themselves right from the outbound belt to the vehicle and automated pallet containers marked 5 and 7 move themselves further right on the outbound belt. In phase 4, automated pallet containers marked 6 and 8 move themselves to the right side of the vehicle allowing automated pallet containers marked 5 and 7 to move themselves right from the outbound belt to the vehicle. Automated pallet containers marked 1, 2, 3 and 4 are still being moved by the inbound belt in sync with the vehicle until it reaches the end of the belt. The vehicle continues to the end of the belt line where it resumes manual control by the driver (or driverless vehicle control system) and it continues in its route carrying automated pallet containers marked 5, 6, 7 and 8.

Once unloaded from the belt conveyor systems 370a, the automated pallet containers 350 move themselves to the directed locations within the facility. In one embodiment, the vehicle 304 can move at a speed that approximates or matches a speed of the belt conveyor systems 370a, 370b to facilitate the transfer of automated pallet containers 350 from the vehicle to the belt conveyor systems. The belt conveyor systems 370a, 370b can also be configured to transfer automated pallet containers 350 from the belt conveyor systems onto a vehicle, such as vehicle 304.

Figure 29:
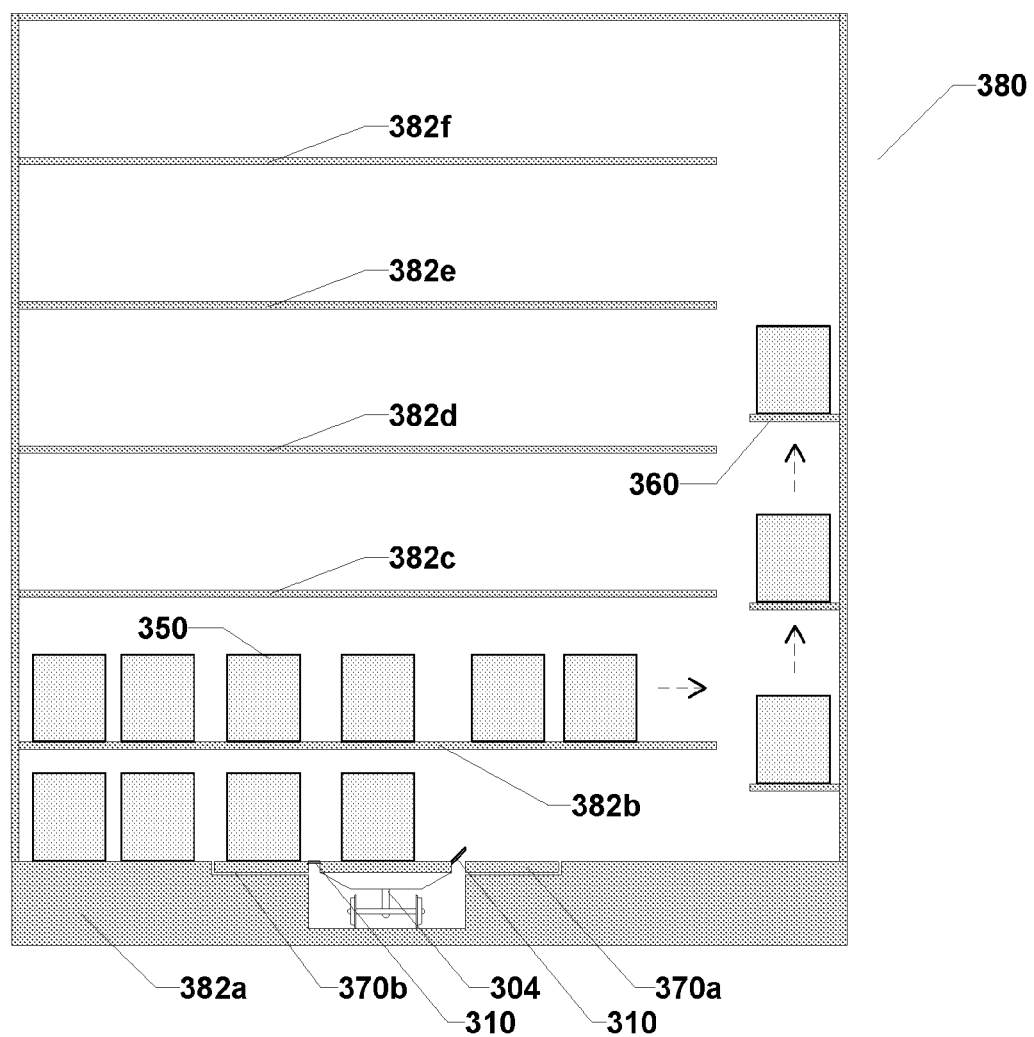
FIG. 29 is a cross-sectional view of a facility showing the vehicle passing through with automated pallet containers loading and unloading from the adjacent belt conveyor system while other automated pallet containers move horizontally by their own self motion and vertically throughout the facility with the assistance of lifts.

Referring to FIG. 29, an exemplary facility, generally indicated at 380, is configured to deploy automated pallet containers of embodiments of the present disclosure, e.g., automated pallet containers 350. As shown, the facility 380 includes multiple floors, e.g., six floors 382a, 382b, 382c, 382d, 382e, 382f, each vertically separated from one another. The facility 380 further includes a lift, e.g., lift 360, which is shown in several positions within the facility to transport items vertically within the facility from one floor to another floor. The facility 380 further includes several belt conveyor systems, e.g., two belt conveyor systems 370a, 370b, which are provided on opposite sides of a transport lane sized to enable a vehicle to travel therethrough. As described, the vehicle 304 includes hinged flaps 310 to provide a means of bridging gaps between the vehicle and the belt conveyor systems 370a, 370b when the automated pallet containers 350 move themselves laterally between them. In FIG. 29, the hinged flaps 310 are shown in multiple positions. It should be understood that the facility 380 shown in FIG. 29 is exemplary for illustration purposes only and not limiting to the scope and manner in which the systems disclosed herein can be deployed.

In some embodiments, the automated pallet container is configured to function as an automated guided vehicle (AGV). In one embodiment, the automated pallet container includes a controller as shown in FIG. 21 that is adapted to control the operation of the automated pallet container based on operational parameters obtained by the controller. The controller can be configured to communicate with a controller associated with a facility, for example, a warehouse management system. In one embodiment having multiple automated pallet containers, the controller may embody a plurality of controllers provided in each automated pallet container that communicates with one another over a controller area network (CAN) Bus or other type of network. In other embodiments, a master controller may be provided to control the operation of the controllers of the automated pallet containers.

In some embodiments, each automated pallet container may be provided with a display, which is operably coupled to the controller. The display is adapted to display the operational parameters of the automated pallet container, such as, but not limited to, the products supported by the automated pallet container. Suitable monitors may be provided to acquire such information. Alternatively, or in addition to the foregoing embodiment, information may be displayed on a display provided within the facility.

In one embodiment, a barcode to identify the products supported by the automated pallet container can be implemented. For example, the barcode can include a 1D scanner for UPC codes, a 2D scanner for QRC codes, a printed label applied on the item or a laser etched label etched on the item. In another embodiment, an RFID system to identify the products can be implemented. For example, the RFID system can include an RFID tag applied to the product and an RFID reader associated with the automated pallet container or the facility. With an RFID system, line-of-site between the reader and the item is not required. Moreover, scanning is not required to identify all products within the automated pallet container.

In some embodiments, a database is provided to keep track of products supported by the automated pallet container. In one embodiment, the database may include an open application (App) architecture and be configured to push data to the facility, for example. The automated pallet container can be configured to communicate with the facility. The database can include product information. In one embodiment, the database further can communicate with a system configured to control the transport of products.

The database further can be configured to retrieve information about products based on identification, e.g., a barcode number. In one embodiment, a central management system can be provided in which the automated pallet container is programmed to accept material stored on the automated pallet container. The automated pallet container can be programmed to update the database to identify the materials on the automated pallet container, load information into the database associated with the automated pallet container from a network, which is tied back to the system. Other systems can be provided, such as weight sensors, to provide additional information to the database.

The database further can be configured to store additional information, such as usage and consumption. The database can be configured to store information locally or remotely, and can be configured to store data associated with one or more production runs. For example, the database can be configured to obtain and store data including but not limited to traceability of products provided on the automated pallet containers.

The database can be configured to share prediction data, such as the real-time locations and time of arrival of automated pallet containers. The database can be configured to share prediction data with other systems.

The database can be configured to store data associated with lot traceability of products supported on the automated pallet container. In addition, RFID or mechanical keying of a product is provided to ensure correct product location. This information can be used to verify that the correct product is provided to be transported from a warehouse to a destination location. A low-cost reader can perform this function.

In some embodiments, the automated pallet container can be configured to store products for long periods of time. The automated pallet container can be configured to be flexible to accommodate where the products come from and where the products go to. In addition, the automated pallet container can be configured to identify where a particular product is located on the automated pallet container. In certain embodiments, the location, whether by auto delivery or manual delivery, is remote, local, on the automated pallet container. As mentioned above, the automated pallet container can be configured to control environmental parameters. For example, the automated pallet container can be configured to control temperature for products. The automated pallet container further can be configured to predict when to start cooling or heating the products based on transport parameters. The automated pallet container further can be configured to control humidity to avoid condensate. The automated pallet container further can be configured to operate in a clean environment.

In some embodiments, the automated pallet container can be configured to perform inventory control. Specifically, the automated pallet container can be configured to identify where products are located, how many products have been removed, tie the products and information about the products to a customer inventory control system, and track the products during transport by the automated pallet container.

In some embodiments, the automated pallet container can be configured to organize products stored on the automated pallet container. As mentioned above, in one embodiment, one automated pallet container can be provided to store, transport and deliver a single product or multiples of products.

In some embodiments, the automated pallet container can be configured to transport products from the automated pallet container to a belt conveyor system and from the belt conveyor system to the automated pallet container, and be able to account for elevation differences between the automated pallet container and the belt conveyor system. The transportation can be automated or manual. In one embodiment, the automated pallet container can be moved by automatically guided vehicle (AVG) technology associated with the base of the automated pallet container or remotely controlled. In another embodiment, the automated pallet container can be configured to move autonomously. In another embodiment, the automated pallet container can be configured to be moved manually. In yet another embodiment, the automated pallet container can be configured to move products stored on the automated pallet container automatically and/or manually. For example, the automated pallet container can be configured to move products automatically, and can provide for an interruption of a pre-planned activity in which the products are moved manually.

In some embodiments, timing associated with performing transportation functions of the automated pallet container can be programmed to account for the vehicle transporting the automated pallet container or the belt conveyor system moving the automated pallet container.

In some embodiments, the automated pallet container is configured to perform inspection of products contained within the automated pallet container. In one embodiment, a scanner associated with the automated pallet container can be configured to scan bar codes, for example, associated with the products. In another embodiment, a vision system associated with the automated pallet container can be configured to obtain images of the products. The vision system in conjunction with the controller, can be configured to inspect for cleanliness, damage, wear, and identification readability, e.g., is the barcode label worn, dirty or torn. The vision system can embody any type of 2D, 3D or color camera. Other systems are contemplated, such as a light detection and ranging (LIDAR) camera configured to scan a space, collect data on the space, and use this information to improve autonomous control of the automated pallet container.

In some embodiments, the automated pallet container can be configured with actuation devices or actuators to move products onto and off of the automated pallet container once the automated pallet container is positioned next to the belt conveyor system. Embodiments of the actuators can be implemented on the automated pallet container, the belt conveyor system, or both. In another embodiment, the products can be manually loaded and unloaded from the automated pallet container.

In some embodiments, the automated pallet container can be configured to communicate with the vehicle or the facility via an open platform. Communication systems can include a wired system, a wireless system (through a common network, mesh, Bluetooth, Wi-Fi, Zigbee, WAN, Nodes, Li-Fi, etc.), a combination of wired and wireless systems, and infrared (IR) system.

In some embodiments, the automated pallet container can be configured with a dedicated power source. In one embodiment, the automated pallet container includes a battery provided in the base that is configured to power automated components provided in the automated pallet container. In other embodiments, the automated pallet container can be configured with an uninterruptible power supply. The power source can be configured to recharge for autonomous operations, e.g., recharge a battery from power provided by the vehicle or the facility. In one embodiment, the battery is configured to be charged by a wireless charging system.

In some embodiments, the automated pallet container can be configured to function and communicate with the vehicle and/or the facility. For example, the automated pallet container can be configured to provide a handshaking function with the vehicle and/or the facility prior to a transfer of a product. The automated pallet container can be configured with a communication protocol and/or a library reference on what is available to consume. The automated pallet container can be configured to determine whether the automated pallet container has correct products. The handshaking function can be configured to ensure the correct transfer of a product, e.g., "here's stencil #1234," and/or the subsequent transfer of a product, e.g., "I now have stencil #1234." In one embodiment, a mobile device can be configured to scan and identify products in the automated pallet container, and determine, for example, whether the products are ready for use, require cleaning, etc.

In some embodiments, the automated pallet container can be configured to address errors associated with handling and recovering products in the automated pallet container. For example, the automated pallet container can be configured to detect an incomplete action by one party, an incomplete transfer of a product, a dropped transfer of a product, and a manual intervention or override. In one embodiment, a controller associated with the automated pallet container can be configured to perform static discharge control, data recovery and/or security.

In some embodiments, the facility and/or the automated pallet container can be configured with a higher level of capability. For example, the facility can be configured to control the operation of multiple components, including the hinged flaps of the vehicles, the belt conveyor systems, and the transfer mechanisms associated with the automated pallet containers.

In some embodiments, the automated pallet container can be configured to track products contained within the automated pallet container, and to communicate information to other entities, such as vehicles and facilities.

In some embodiments, the automated pallet container can be configured to scan all products supported by the automated pallet container, such as a barcode reader or RFID reader.

In some embodiments, the automated pallet container can be configured with an indexing mechanism to properly locate and move products within the automated pallet container.

In some embodiments, the automated pallet container can be configured to be moved manually or by an automated guided vehicle (AGV), which in one embodiment may be embodied within the automated pallet container.

In some embodiments, the automated pallet container can be configured to be climate controlled, either actively or passively.

In some embodiments, the automated pallet container can be configured be controlled by an application (App) capable for smartphone integration.

As used herein, "transport," "transporting," "transfer" or "transferring" describes moving an automated pallet container from one position to another, either manually or automatically.

As used herein, a "base" describes a bottom section of the automated pallet container, which is a standard shipping pallet with improvements described herein.

As used herein, a "building" describes an occupiable space used for business or residence which is generally the final destination of an item.

As used herein, a "belt conveyor system" describes a conveyor system consisting of two or more pulleys or drums, with an endless loop of carrying medium, such as a conveyor belt, that rotates about them. One or both of the pulleys are powered, moving the belt and the material on the belt in a desired direction at a desired speed.

As used herein, a "cover" describes a five-sided enclosure compatible with the base and intended to be combined with the base to form an intermodal container with improvements described herein.

As used herein, a "conveyance" describes a forklift, pallet jack, front loader jacking device or crane used to move shipping pallets and/or intermodal containers from place to place in or around a building or facility or on and off a vehicle.

As used herein, a "facility" describes a space where conveyances operate and the specific activities of manufacturing, storing, sorting and organizing items, loading and unloading those items on and off shipping pallets, loading and unloading shipping pallets carrying items in an out of intermodal containers and loading and unloading intermodal containers carrying shipping pallets with Items to and from vehicles occur.

As used herein, a "container" or "intermodal container" describes a standardized shipping container, designed and built for intermodal freight transport, meaning the container and/or intermodal container can be used across different vehicles without unloading and reloading their cargo; which is typically shipping pallets loaded with items.

As used herein, an "item" or "product" describes any type of object or product or goods that are produced and shipped between buildings and facilities, typically utilizing a shipping pallet and intermodal container on some or all of its journey.

As used herein, a "lift" describes a type of vertical transportation device that provides the means to move items (in this case bases or automated pallet containers) between floors, levels or decks of a building or facility.

As used herein a "pallet" or "shipping pallet" describes a flat transport structure, which supports one or more items in a stable fashion while being moved by a conveyance or within an intermodal container. A pallet is the structural foundation of a load of items. Items placed on a pallet are secured with various wrapping for lateral stability and prevention of items falling off the pallet. Loaded pallets are typically loaded into and unloaded from intermodal containers by conveyances.

As used herein, a "vehicle" describes any mechanism used to transport items and products and may refer to but not limited to airplanes, helicopters, drones, ships, rail cars, trucks, tractor trailers, busses and cars together or individually.

The aspects disclosed herein in accordance with the present disclosure, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. An intermodal container comprising:
   a base having a defined number of sides, the base being configured to support products during transport, the base including wheels or casters provided on a bottom of the base to enable movement of the base on a horizontal surface, a motor integrated into the base to drive the movement of wheels or casters to move the base along the horizontal surface, and a power storage device integrated into the base to provide means for powering the motor;
   a removable cover having a top and a defined number of sides matching the defined number of sides of the base, the removable cover being configured to be releasably secured to the base to define an enclosure in a use position and to be removed in a stored position; and
   a controller coupled to the motor and the power storage device, the controller being configured to control the independent movement of the base, the controller further being configured to communicate with and obtain operational parameters from a master controller associated with a facility.

2. The intermodal container of claim 1, wherein the defined number of sides of the base is four and the defined number of sides of the removable cover is four.

3. The intermodal container of claim 1, wherein the base further includes at least one void formed therein to enable a conveyance to lift and move the base.

4. The intermodal container of claim 1, wherein the base further includes an interlocking mechanism integrated into the base to provide connect the base to a vehicle.

5. The intermodal container of claim 1, wherein the base further includes at least one interlocking device integrated into the base to connect a base to another base.

6. The intermodal container of claim 1, wherein the base further includes an electromagnetic device integrated into the base to guide motion of the base along a magnetic field provided on the horizontal surface.

7. The intermodal container of claim 1, wherein the base further includes one or more electromagnetic devices integrated into the base to interact with corresponding magnets in an adjacent surface to power motion of the base.

8. The intermodal container of claim 1, wherein the base further includes one or more interlocking mechanisms integrated into the base to connect the base to a vehicle.

9. The intermodal container of claim 1, wherein the base is formed with a perimeter lip and attachment devices to releasably secure the cover to the base.

10. The intermodal container of claim 1, further comprising a system configured to communicate with the controller to enable tracking of products supported by the base and enclosed by the cover.

11. The intermodal container of claim 10, wherein the system uses location services to determine a location of the intermodal container.

12. The intermodal container of claim 1, wherein the controller is configured to control an interlocking system designed to engage or disengage the base from a support surface.

13. The intermodal container of claim 1, wherein the controller is configured to determine whether the base is properly aligned with a lift or a vehicle to permit controlled movement of the intermodal container between the lift and the vehicle.

14. A system of moving products, the system comprising:
an intermodal container including
a base having a defined number of sides, the base being configured to support products during transport, and
a removable cover having a top and a defined number of sides matching the defined number of sides of the base, the removable cover being configured to be releasably secured to the base to define an enclosure; and
a controller configured to identify and monitor a location of the intermodal container, the controller further being configured to communicate with and obtain operational parameters from a master controller associated with a facility, the controller further being configured to operate with a vehicle configured to support and transport the intermodal container,
wherein the vehicle further is configured to operate with a belt conveyor system provided on a platform of a facility, the belt conveyor system including a conveyer belt that moves at a synchronized speed with the vehicle to enable the loading and unloading of the intermodal container.

15. The system of claim 14, further comprising at least one hinged flap to bridge a gap between the vehicle and a belt conveyor system when the intermodal container is moved laterally between the vehicle and the belt conveyor system.

16. The system of claim 15, wherein the at least one flap is configured to be moved to and from a generally vertical position in which the flap is positioned against the intermodal container and a generally horizontal position in which the flap extends horizontally away from the vehicle.

\* \* \* \* \*